(12) United States Patent
Craft

(10) Patent No.: US 7,764,787 B2
(45) Date of Patent: Jul. 27, 2010

(54) SYSTEM AND METHOD FOR AUTHENTICATING SOFTWARE USING PROTECTED MASTER KEY

(75) Inventor: David Craft, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 616 days.

(21) Appl. No.: 11/681,254

(22) Filed: Mar. 2, 2007

(65) Prior Publication Data

US 2007/0147605 A1    Jun. 28, 2007

Related U.S. Application Data

(62) Division of application No. 10/464,897, filed on Jun. 19, 2003, now Pat. No. 7,475,254.

(51) Int. Cl.
H04L 9/00    (2006.01)
G06F 12/14    (2006.01)

(52) U.S. Cl. .......................................... 380/28; 713/187
(58) Field of Classification Search ....................... None
See application file for complete search history.

(56) References Cited

U.S. PATENT DOCUMENTS

2001/0043702 A1 * 11/2001 Elteto et al. ................. 380/278

2003/0037237 A1 * 2/2003 Abgrall et al. ............... 713/166

FOREIGN PATENT DOCUMENTS

| TW | 335581 | 7/1998 |
|---|---|---|
| TW | 395107 | 6/2000 |
| TW | 431108 | 4/2001 |
| TW | 437229 | 5/2001 |
| TW | 486902 | 5/2002 |
| TW | 512616 | 12/2002 |
| TW | 532008 | 5/2003 |

* cited by examiner

*Primary Examiner*—Brandon S Hoffman
(74) *Attorney, Agent, or Firm*—VanLeeuwen & VanLeeuwen; Matthew B. Talpis

(57) ABSTRACT

A processing unit includes a read-only encryption key. Software is loaded into a system memory area from a non-volatile storage device. Software code image that resides in the system storage area includes a prefix value and a suffix value. The prefix value is combined with the master key from the processing unit to create a random value that is the seed for a hashing algorithm. The hashing algorithm uses the seed value with a signature formed from the blocks of code to form a result. Finally, after the last block has been processed, a final result remains. The suffix value is combined with the master key, this hash result is compared with the result that was created using the hashing algorithm on the code. If the two results match, the code is authenticated and is executed. If the results do not match, the code is not loaded.

11 Claims, 17 Drawing Sheets

SYSTEM AND METHOD FOR AUTHENTICATING SOFTWARE USING PROTECTED MASTER KEY

RELATED APPLICATION

This application is a divisional of application Ser. No. 10/464,897 filed Jun. 19, 2003, titled "System and Method for Authenticating Software Using Protected Master Keys," and issued as U.S. Pat. No. 7,475,254 on Jan. 6, 2009, and having at least one of the same inventors as the above-referenced application.

BACKGROUND OF THE INVENTION

1. Technical Field

The present invention relates in general to a system and method for authenticating software. More particularly, the present invention relates to a system and method for using a protected master key located on a computer system for authenticating software.

2. Description of the Related Art

In our modern society, software is increasingly becoming one of the most valuable technologies. Software controls devices, such as appliances, automobiles, telephones, and especially computer systems. Computer systems exist in a variety of forms. These forms include traditional desktop and notebook computers, as well as pervasive computing devices such as mobile telephones, and personal digital assistants (PDAs). In addition, software is used for entertainment purposes, such as games designed for personal computers as well as games designed for specialized gaming devices.

Large amounts of time, money, and resources are dedicated towards creating software. Many companies derive all or most of their income from creating software. Software programs sold by these companies include customized software that is written for particular environment or client, as well as off-the-shelf software that is designed in written for larger group of users.

Because software is so valuable, and because computers make it easy to create an exact copy of a program, software piracy is widespread. Software pirates range from individual computer users to professionals who deal wholesale with stolen software. Software piracy exists in homes, schools, businesses, and governments.

Anti-piracy measures that have previously been employed include encrypting the software program. In this manner, the user is provided with a "key" for opening the software along with the encrypted software program. Only a user with the right key can decrypt the software. A challenge of this method, however, is that experienced hackers can analyze the memory containing the executable form of the decrypted code and create a non-encrypted version. The non-encrypted version can then be distributed to others who no longer need to use the "key" to open the software.

Another anti-piracy measure is to use a device, often called a "dongle," that must be used in order for the software to operate. The device includes a key that is checked by the software before the software will operate. One challenge of this method is that users are often forced to have several devices that they must attach to computers prior to loading the software program. Another challenge is that experienced hackers can read the key being provided by the attached device and create a copy of the device or provide the key value using another software program.

FIG. 1 is a block diagram showing how a hacker monitors a system bus to illegally copy program data in the prior art. Computer system 100 includes system memory 110 and processing core 130 that are interconnected with system bus 125. System memory 110 is where software program and data 120 are stored, typically after being read from a nonvolatile storage area, such as a disk drive or a nonvolatile memory. Protected area 130 is a packaged component that includes one or more central processing units (CPUs) 135 and a small amount of storage 140 that is used for program storage 145 and data storage 150. Storage 140 may include registers, RAM, and other types of memory. Because of size constraints of the protected area package, the amount of storage 140 is typically far less than the amount of memory included in system memory 110, and is usually insufficient to contain a complete working copy of the software program and data. This then requires the software code and data to reside in executable form in system memory 110.

Even if the source of the software stored in system memory 110 is encrypted, the program and data must first be decrypted before it can be processed by the CPUs. A hacker may then use a hacking, or snooping, tool 170 in order to capture an executable form of the software program and data during this decryption process. The hacker's snooping tool monitors the decrypted data that flows over the system bus from the system memory to the protected area (step 175) and copies the data (step 180), creating illegal copy 190. Illegal copy 190 is not encrypted (even if the original program was encrypted) and can be executed on any computer system that is compatible with the software. What is needed, therefore, is a system and method for authenticating software using a protected master key that is stored on a computer system.

SUMMARY

It has been discovered that the aforementioned challenges are resolved using a system and method that authenticates software based upon a protected master key. A processing unit, such as a central processing unit (CPU), includes a read-only master key that is unique, random, and non-trivial. Software is loaded into a system memory area from a nonvolatile storage device. The system memory area may include flash memory, read-only memory (ROM), random access memory (RAM) or any other type of storage. Encrypted code that resides in the system storage area includes a prefix value and a suffix value.

The prefix value is XORed with the master key from the processing unit to create a random value which is used as the "seed" or starting value for a hashing algorithm, such as SHA-256. The seed value is used as the initial result in the hashing algorithm. Software code that follows the seed value is read in blocks, such as 512 byte blocks. The hashing algorithm uses the seed value with a signature formed from the newly read block of code to form a result. This result is then used by the hashing algorithm along with the next block of code to form a new result. Processing continues through the entire code, one block at a time, with a new or amended result being produced as each block is processed. Finally, after the last block has been processed, a final result remains. The suffix value is XORed with the master key creating another hash result. The hash result created using the suffix value is compared with the final result that was created by using the hashing algorithm on the code. If the two results match, the code is loaded by the software loader and allowed to execute. On the other hand, if the results do not match, the code is not loaded. In addition, a message may be sent to the software distributor informing the distributor that someone has attempted to hack the source image of a particular software program The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
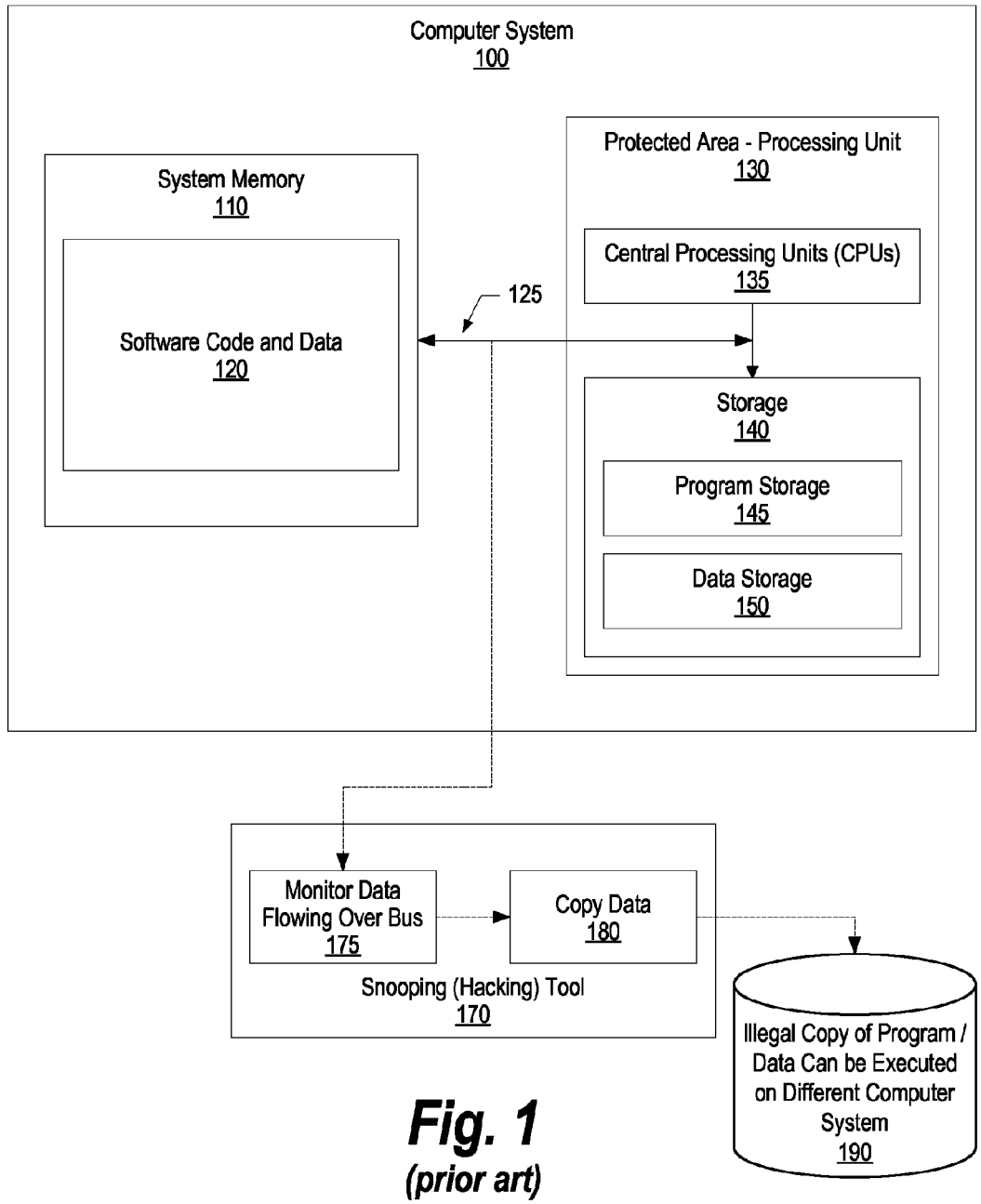
FIG. 1 is a block diagram showing how a hacker monitors a system bus to illegally copy program data in the prior art.

FIG. 1 is a block diagram showing how a hacker monitors a system bus to illegally copy program data in the prior art. See the background section, above, for details regarding the prior art.

Figure 2:
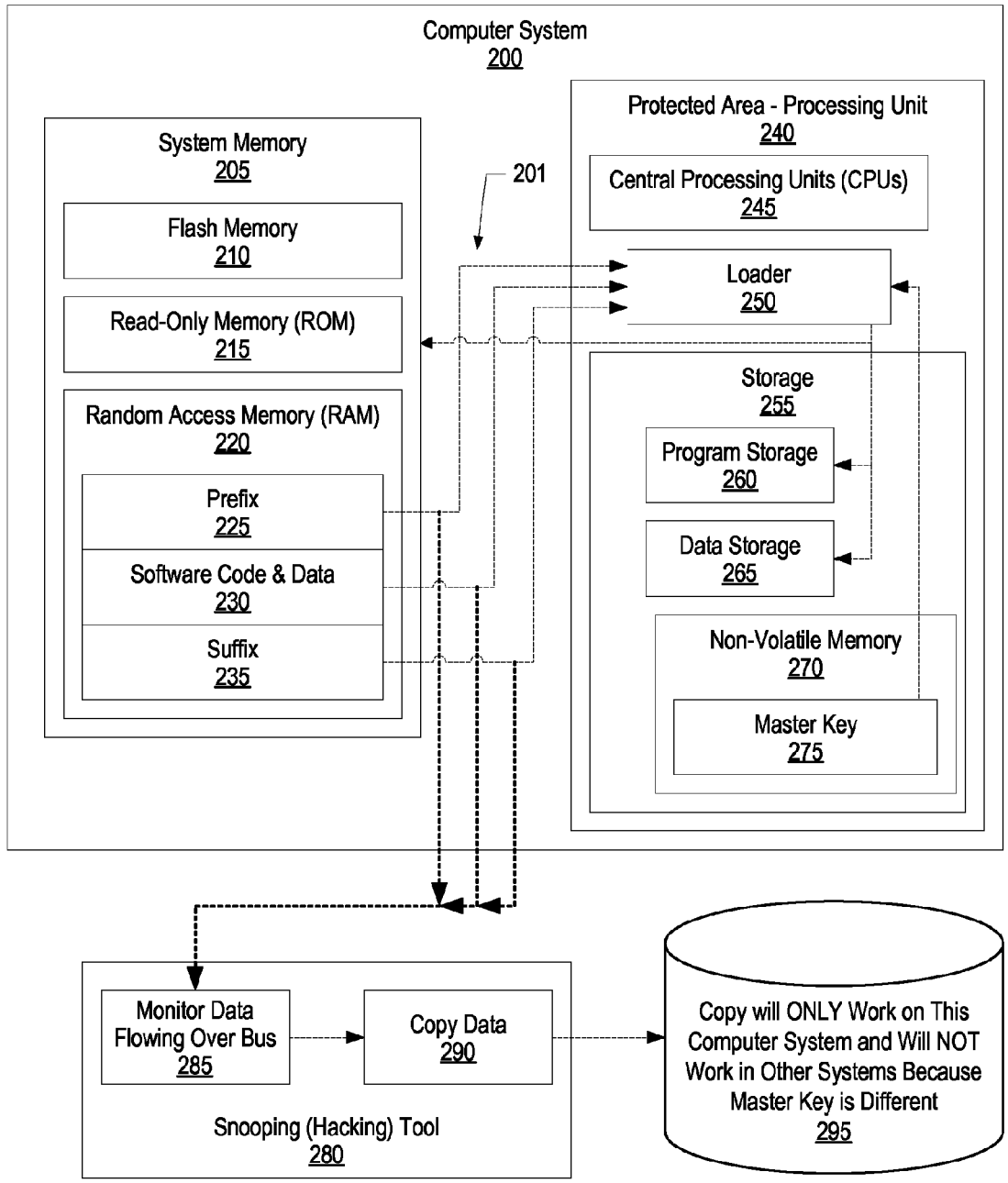
FIG. 2 is a block diagram showing the present invention preventing copies from executing on other devices.

FIG. 2 is a block diagram showing the present invention preventing copies from executing on other devices. Computer system 200 includes system memory 205 and processing core 240 that are interconnected with system bus 201. System memory 205 is where software code and data 230 are stored, typically after being read from a nonvolatile storage area, such as a disk drive or a nonvolatile memory. System memory may include flash memory 210, read-only memory (ROM) 215, and random-access memory (RAM) 220. Unlike the prior art, the software image stored in system memory 205 includes prefix 225 and suffix 235 used to authenticate the software.

Protected area 240 is a packaged component that includes one or more central processing units (CPUs) 245 and a small amount of storage 255 that is used for program storage 260 and data storage 265. Storage 255 may include registers, RAM, and other types of memory. Because of size constraints of the protected area package, the amount of storage 255 is typically far less than the amount of memory included in system memory 205. Storage 255 also includes a small amount of nonvolatile memory 270, such as nonvolatile RAM or programmable fuses (e-fuses). Master key 275, used to authenticate software, is stored in the nonvolatile memory. Master key 275 is designed to be a unique (per protected package), non-trivial and random number of sufficient length (i.e., 256 bits) to enable strong authentication. Because the master key is included in the protected package, the only way a hacker would be able to read the master key is by physically removing layers from the packaging in order to expose the value of the master key, destroying the protected area in the process. Thus, while the hacker could obtain the value of the master key in a particular machine, that machine would be destroyed by the hacker's process and the master key obtained would be different from the master keys stored on other machines.

Protected area 240 also includes loader 250. Loader 250 is a specialized process used to load software and authenticate it using master key 275. Because both loader 250 and master key 275 are within protected package 240, the master key is not transmitted over bus 201 or over any bus or communication line that exits the protected package.

A hacker uses a hacking, or snooping, tool 280 in order to attempt to copy the software program and data. The hacker's snooping tool monitors the data, including the prefix value, the software code and data, and the suffix value that flows over the system bus from the system memory to the protected area (step 285) and copies the data (step 290), creating copy 295. However, because the master key was never transmitted over the bus, the hacker was unable to obtain the master key value. Because master key values are preferably unique, non-trivial, random numbers, the hacker's copy of the software will only operate on the computer system from which it was copied. Importantly, the copied data (prefix value, software code and data, and suffix value) will not operate on a different machine because the other machine has a different master key that will not work with the copy. See the description for FIG. 5, below, for details on how the authentication process works using the prefix and suffix values.

Figure 3:
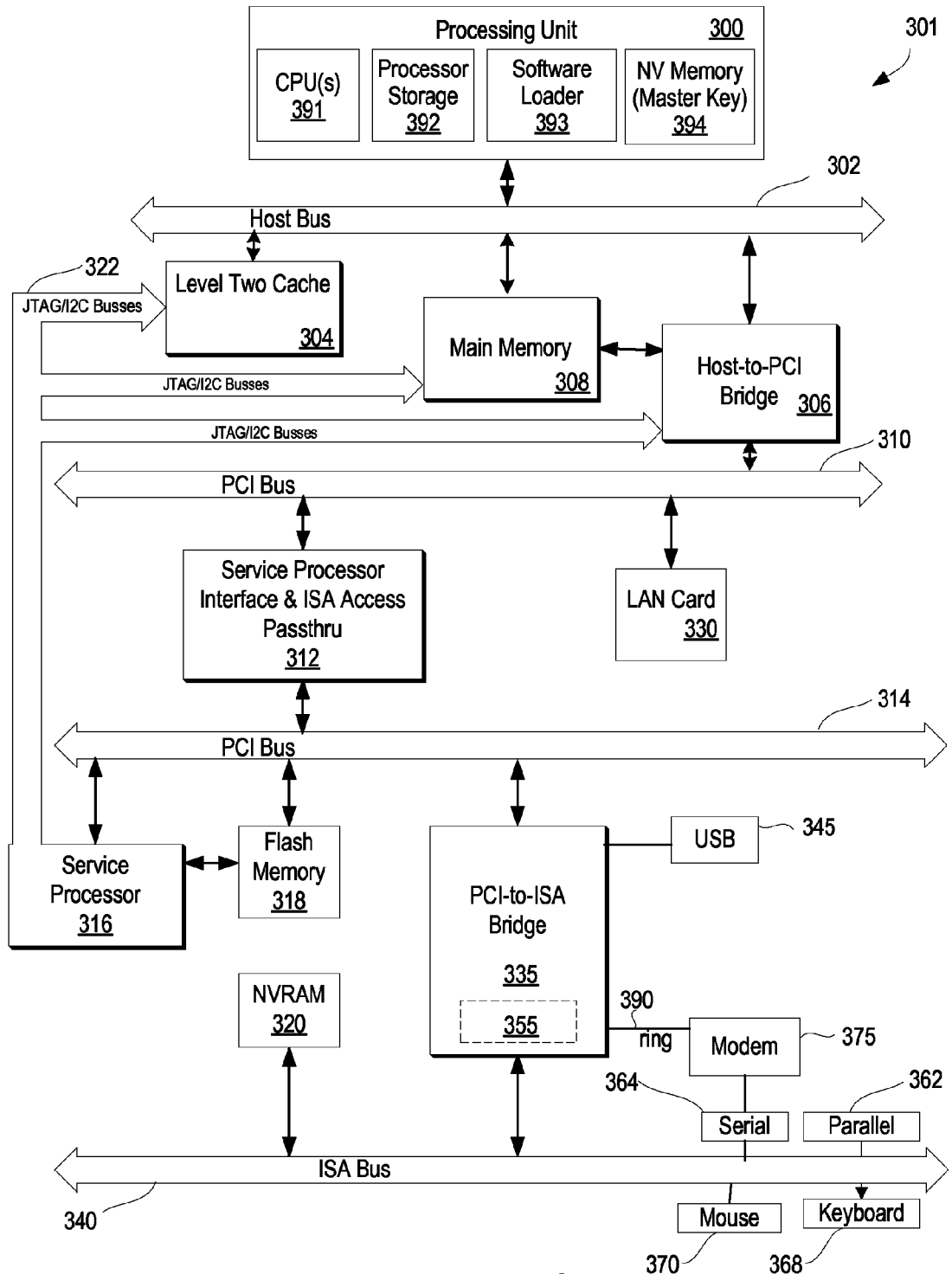
FIG. 3 is a block diagram of a computing device capable of implementing the present invention.

FIG. 3 illustrates information handling system 301 which is a simplified example of a computer system capable of performing the computing operations described herein. Computer system 301 includes processing unit 300 that is packaged in a semiconductor package and coupled to host bus 305.

Protected processing unit includes one or more processors 391, processor storage 392 used to load and execute software programs from main memory 308, software loader 393 used to authenticate and load software programs, and locked nonvolatile memory area 394 which is used to store a master key that is only accessible from within processing unit 300 and is not transmitted across host bus 302. Processing unit 300 is connected to host bus 302. A level two (L2) cache memory 304 is also coupled to host bus 302. Host-to-PCI bridge 306 is coupled to main memory 308, includes cache memory and main memory control functions, and provides bus control to handle transfers among PCI bus 310, processor 300, L2 cache 304, main memory 308, and host bus 302. Main memory 308 is coupled to Host-to-PCI bridge 306 as well as host bus 302. Devices used solely by host processor(s) 300, such as LAN card 330, are coupled to PCI bus 310. Service Processor Interface and ISA Access Pass-through 312 provides an interface between PCI bus 310 and PCI bus 314. In this manner, PCI bus 314 is insulated from PCI bus 310. Devices, such as flash memory 318, are coupled to PCI bus 314. In one implementation, flash memory 318 includes BIOS code that incorporates the necessary processor executable code for a variety of low-level system functions and system boot functions.

PCI bus 314 provides an interface for a variety of devices that are shared by host processor(s) 300 and Service Processor 316 including, for example, flash memory 318. PCI-to-ISA bridge 335 provides bus control to handle transfers between PCI bus 314 and ISA bus 340, universal serial bus (USB) functionality 345, power management functionality 355, and can include other functional elements not shown, such as a real-time clock (RTC), DMA control, interrupt support, and system management bus support. Nonvolatile RAM 320 is attached to ISA Bus 340. Service Processor 316 includes JTAG and I2C busses 322 for communication L2 cache 304, Host-to-PCI bridge 306, and main memory 308 providing a communications path between the processor, the Service Processor, the L2 cache, the Host-to-PCI bridge, and the main memory. Service Processor 316 also has access to system power resources for powering down information handling device 301.

Peripheral devices and input/output (I/O) devices can be attached to various interfaces (e.g., parallel interface 362, serial interface 364, keyboard interface 368, and mouse interface 370 coupled to ISA bus 340. Alternatively, many I/O devices can be accommodated by a super I/O controller (not shown) attached to ISA bus 340.

In order to attach computer system 301 to another computer system to copy files over a network, LAN card 330 is coupled to PCI bus 310. Similarly, to connect computer system 301 to an ISP to connect to the Internet using a telephone line connection, modem 375 is connected to serial port 364 and PCI-to-ISA Bridge 335.

While the computer system described in FIG. 3 is capable of executing the processes described herein, this computer system is simply one example of a computer system. Those skilled in the art will appreciate that many other computer system designs are capable of performing the processes described herein.

Figure 4:
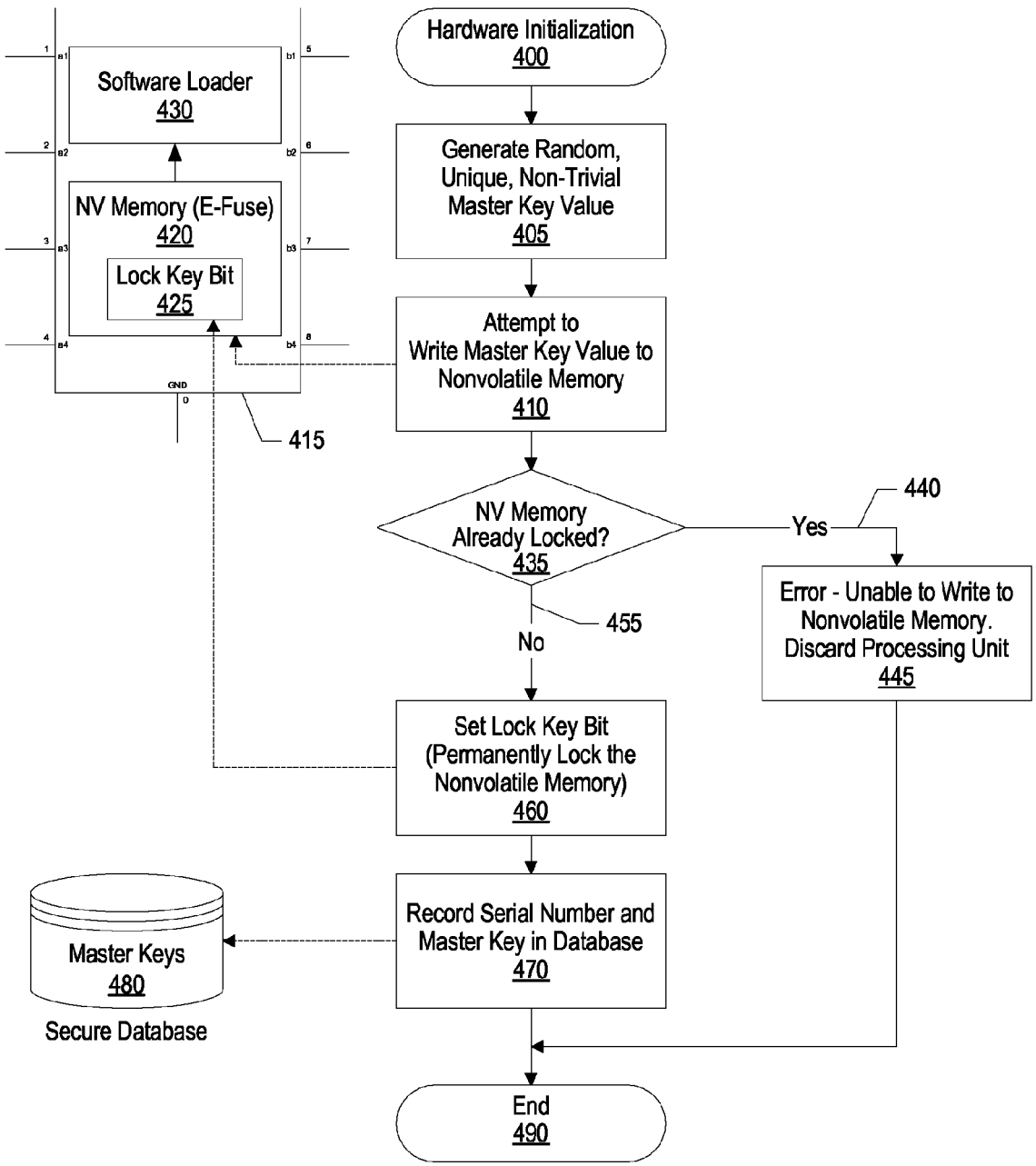
FIG. 4 is a flowchart showing steps taken to initialize hardware with a protected master key that is inaccessible outside the processor core.

FIG. 4 is a flowchart showing steps taken to initialize hardware with a protected master key that is inaccessible outside the processor core. Processing commences at 400 whereupon a random, unique, non-trivial master key value is generated (step 405). At step 410, processing attempts to write the generated master key value to a nonvolatile memory location in protected processor area 415 of the machine that is being initialized. The protected processor area includes a nonvolatile memory, such as a programmable "e-fuse" array 420. The nonvolatile memory location to which the master key value is written is lockable so that once the master key value is written to the nonvolatile memory location and verified, the master key cannot be altered or removed. Lock key bit 425 includes a bit that, once set, cannot be changed. If the lock key has been set, the path used to write to nonvolatile memory area 420 is made inoperative.

A determination is made as to whether the nonvolatile memory location to which the master key value is written has already been locked (decision 435). If the nonvolatile memory location has already been locked, decision 435 branches to "yes" branch 445 whereupon an error is returned indicating that the nonvolatile memory location has already been locked (step 445) and processing ends at 490.

On the other hand, if the nonvolatile memory location has not already been locked, decision 435 branches to "no" branch 455 whereupon the lock key controlling access to the nonvolatile memory location is set (step 460), permanently locking the nonvolatile memory location. The serial number of the machine being initialized is recorded along with the master key value (step 470) in secure database 480. Master key values are stored in a secure database (i.e., one that is protected using encryption and unable to be infiltrated by network hackers) so that hackers and other individuals do not gain access to the master key values which would allow the hacker to circumvent the software authenticity that is provided through the use of the master keys. Processing thereafter ends at 490.

Figure 5:
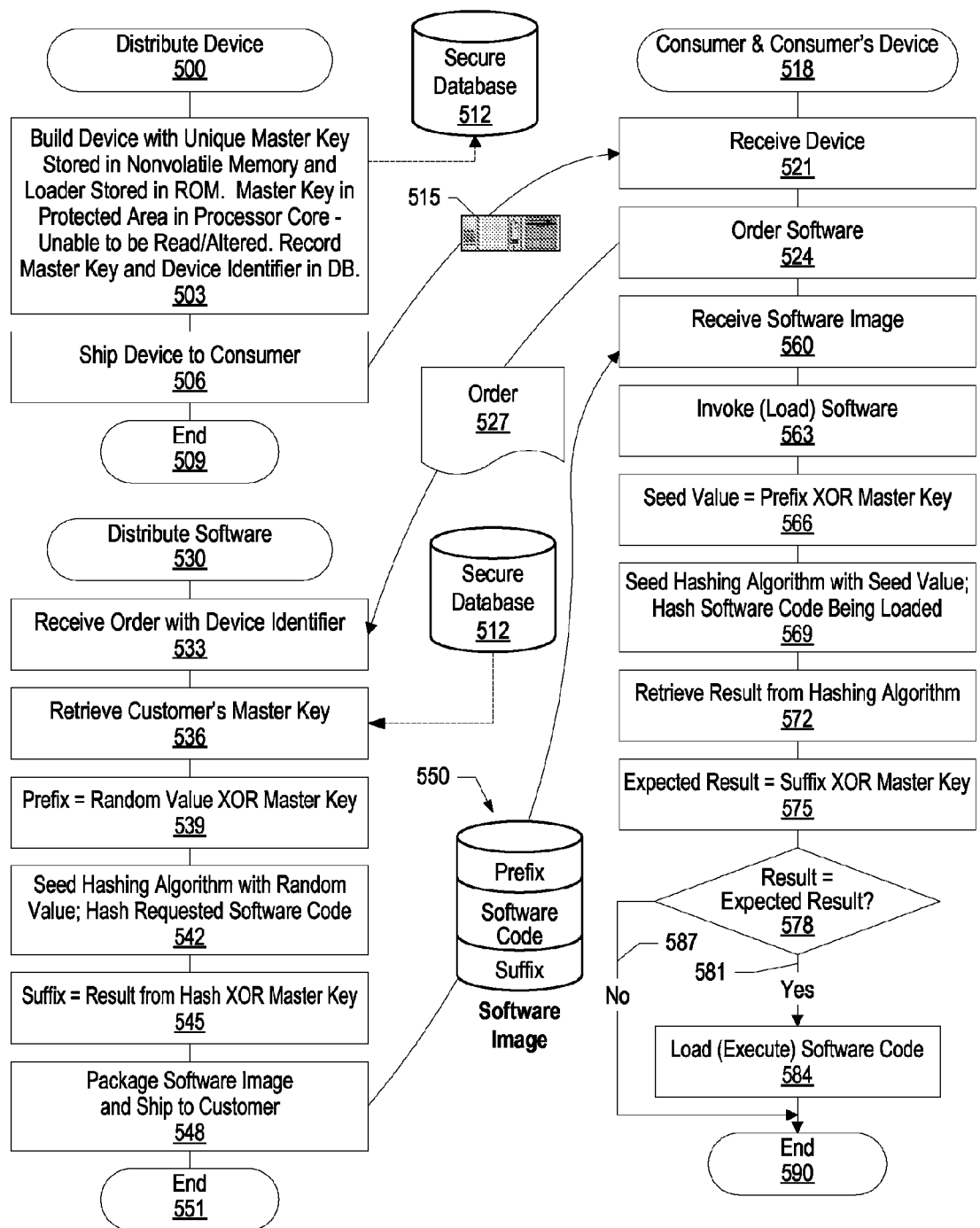
FIG. 5 are high level flowcharts showing steps taken to distribute devices and software to customers and for the customers to load software.

FIG. 5 are high level flowcharts showing steps taken to distribute devices and software to customers and for the customers to load software. Distribute device processing commences at 500 whereupon the device (i.e., machine) is built with a unique master key stored in a locked nonvolatile memory location and a loader programmed to load and authenticate software based upon the master key (step 503). As shown in FIG. 4, the master key value and device identifier (i.e., serial number) are stored in secure database 512. At step 506, device 515 (with the included master key and loader) is shipped to a consumer. Distribute device processing thereafter ends at 509.

Consumer processing commences at 518 whereupon the consumer receives the device with the embedded master key (step 521). At step 524, the consumer orders software for the device by sending order form 527 to a software distributor or retailer. Order form 527 may be electronic (i.e., an Internet order), paper based (i.e., a mailed form), a telephone order, or an order placed at a retail location.

Distribute software processing commences at 530 whereupon the software distributor receives the order along with the device identifier (i.e., serial number) of the consumer's device (step 533). The master key value corresponding to the device is retrieved (step 536) from secure database 512. A prefix value is created based upon the retrieved master key (step 539). In one embodiment, an exclusive or (XOR) operation is performed between a random value and the retrieved master key to create the prefix value.

A hashing algorithm, such as SHA-256, is "seeded" with the random number used to generate the prefix value (step 542). Seeding the hashing algorithm sets the initial result of the hashing algorithm to the seed value, whereupon the hashing algorithm uses the result along with a hash of all or a portion of the software code, to generate additional results. A suffix value is then generated (step 545). In one embodiment, the final result from the hashing algorithm hashing the requested program code is XORed with the master key to create the suffix value. A software image that includes the prefix value, the software code, and the suffix value is packaged together into software image 550 and delivered to the consumer (step 548). Distribute software processing thereafter ends at 551.

Returning to consumer processing, the consumer receives the created software image at step 560. When the user wishes to use the software, he installs and/or loads the software and invokes the software (step 563). In some computing environments, software is first installed by copying the software image to a nonvolatile storage device, such as a hard disk. In another environment, often used with game consoles, the software program is packaged onto a module that is inserted into the game console whereupon the software is automatically invoked.

During the loading process, the loader (located in the protected area of the device) determines the seed value used in the hashing algorithm based upon the prefix value included in the software image and the master key (step 566). In one embodiment, the prefix value is XORed with the master key to generate the seed value. The hashing algorithm (e.g., SHA-256) is seeded with the seed value and hashes the software code included in the software image (step 569). The final result from the hashing algorithm is retrieved (step 572). An expected result value is generated using the master key to check the final result. In one embodiment, the expected result is generated by performing an exclusive OR operation on the suffix value read from the software image and the master key (step 575).

A determination is made as to whether the result from the hashing algorithm is equal to the expected result (decision 578). If the values are equal, decision 578 branches to "yes" branch 581 whereupon the software code is loaded (i.e., executed) by the processor, at step 584. On the other hand, if the values are not equal (indicating that the software has been altered or that the software is not being used on the device for which it was ordered), decision 578 branches to "no" branch 587 bypassing the loading operation shown in step 584. Consumer processing thereafter ends at 590.

Figure 6:
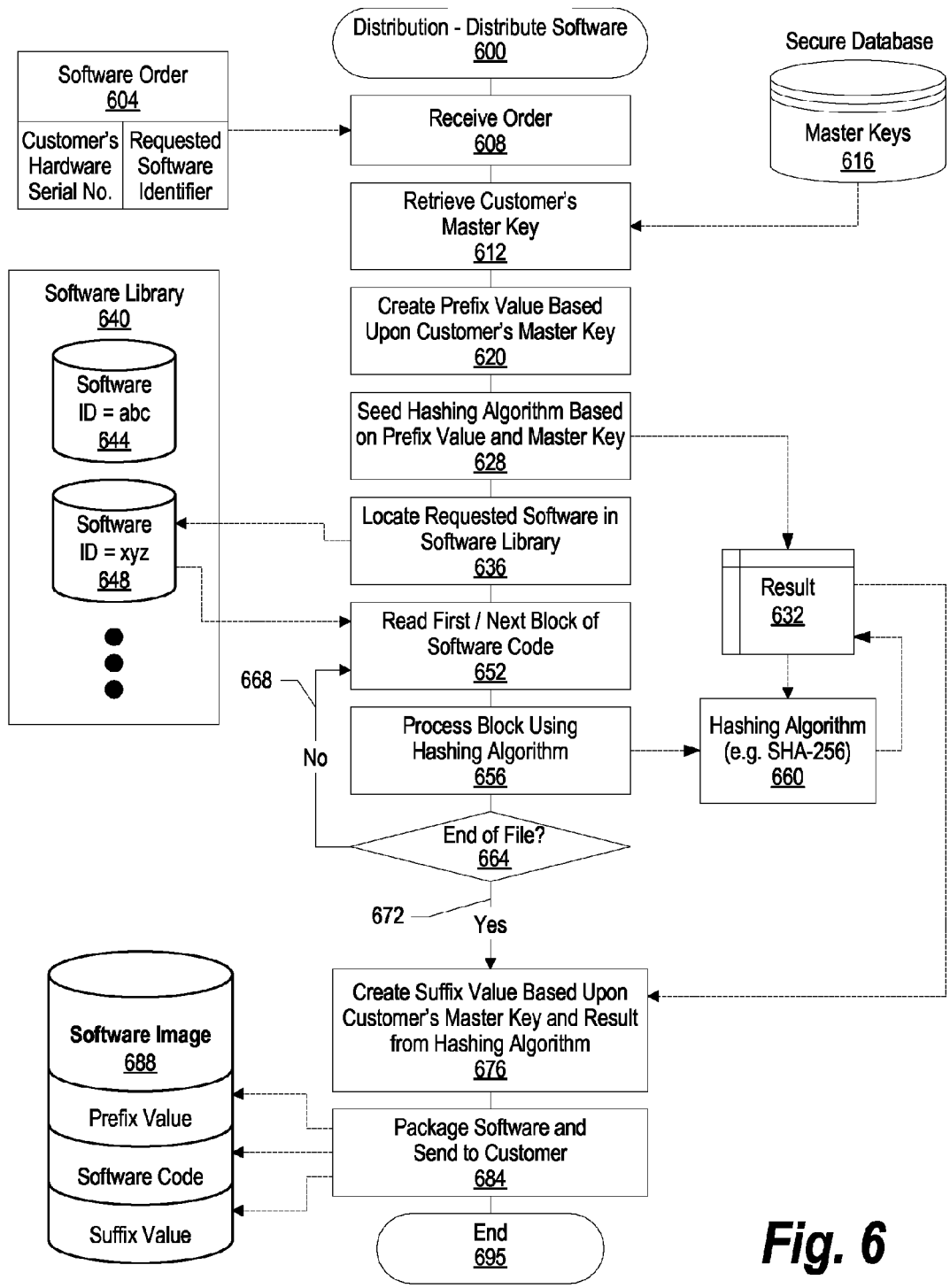
FIG. 6 is a flowchart showing steps taken to distribute software with authentication data.

FIG. 6 is a flowchart showing steps taken to distribute software with authentication data. Distribution processing commences at 600 whereupon, at step 608, order 604 is received for a particular software product. Order 604 includes both the customer's unique device identifier, such as a serial number, along with an identifier corresponding to the requested software product. At step 612, the master key corresponding to the consumer's device is retrieved from secure master key data store 616.

A prefix value is created based upon the master key at step 620. In one embodiment, the prefix value is created by XORing a random number with the master key. In step 628, a hashing algorithm, such as SHA-256, is seeded with a value based on the prefix value and the master key. In one embodiment, the hashing algorithm is seeded with the random number used to create the prefix value. The hashing algorithm is seeded by storing the seed value (e.g., the random number) as the initial value of the hashing result (memory location 632).

At step 636, the requested software is located in software library 640. In the example shown, the requested software is software module 648. At step 652, the first block of software code is read from the requested software module 648. At step 656, the block of software code that was read is passed to a hashing algorithm, such as SHA-256. At step 660, the hashing algorithm receives the block of software code and the seed value stored in result 632. The result of the hashing algorithm is stored in result 632, overwriting the previous (seed) result value.

A determination is made as to whether the end of file has been reached on the software code (decision 664). If the end of file has not been reached, decision 664 branches to "no" branch 668 which loops back to read the next block of software code and process the next block using the hashing algorithm. This time, the hashing algorithm uses the read block of data along with the result from the prior hashing operation to hash the block of code. This looping continues until the end of file is reached on software code 648, whereupon decision 664 branches to "yes" branch 672.

At step 676, a suffix value is created based upon the master key corresponding to the device and the final result from the hashing algorithm. In one embodiment, the suffix value is created by XORing the final result from the hashing algorithm with the master key.

At step 684, software image 688 is created by packaging the prefix value, the software code (i.e., software module 648) and the suffix value into the software image file and sending the software image file to the customer. Distribution processing thereafter ends at 695.

Figure 7:
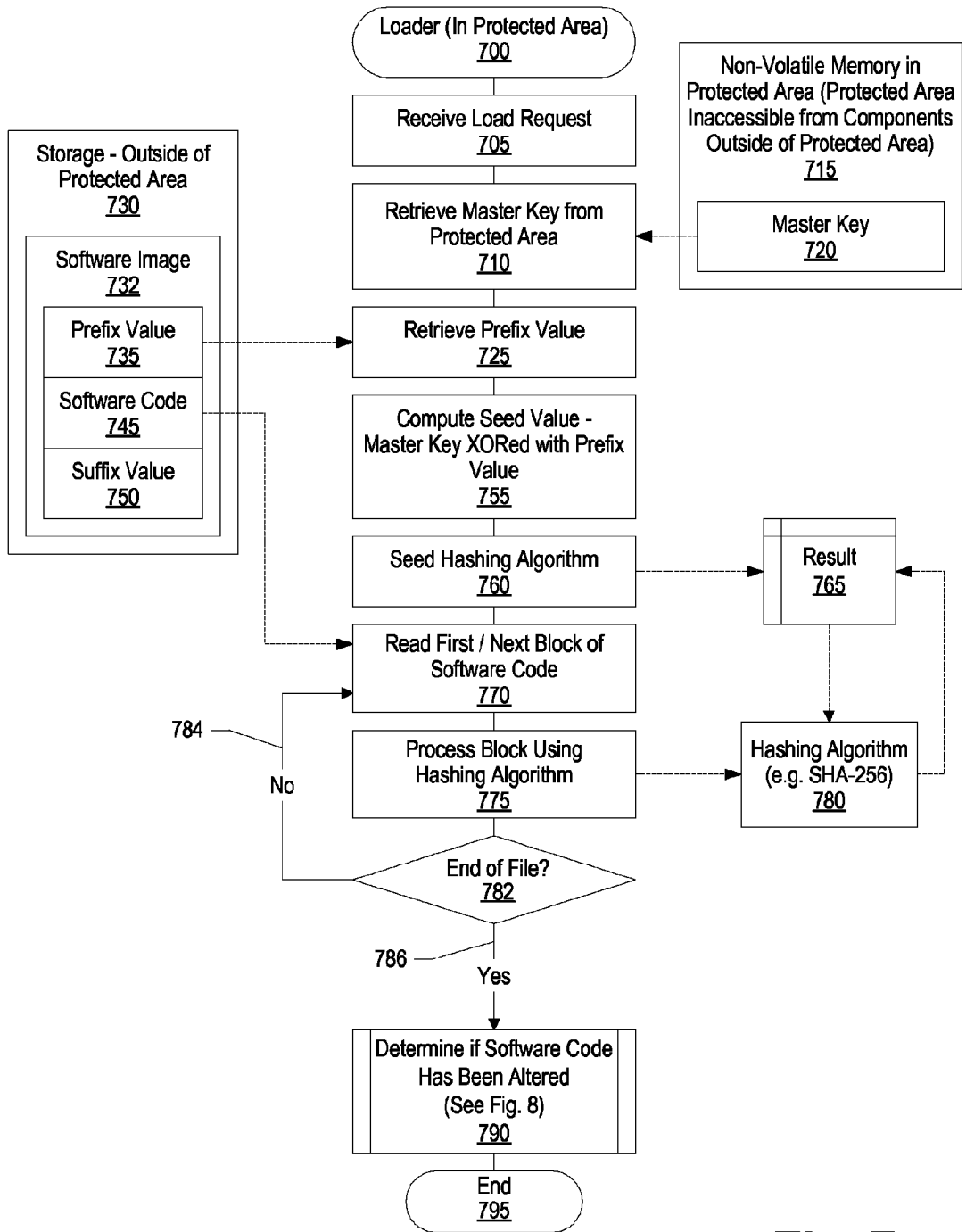
FIG. 7 is a flowchart showing steps taken at the customer's device to load software authenticated using a master key.

FIG. 7 is a flowchart showing steps taken at the customer's device to load software authenticated using a master key. The loader is a process embedded within a protected semiconductor package within the device. The semiconductor package also includes one or more processors and the master key. In this manner, the loader is able to retrieve and use the master key without ever transmitting the master key across a system or memory bus outside of the protected semiconductor package.

Processing commences at 700 whereupon a load request is received for a particular software component (step 705). At step 710, master key 720 corresponding to the device is retrieved from locked nonvolatile memory area 715. In one embodiment, the locked nonvolatile memory area is a set of programmable fuses (e-fuses) that, after being successfully loaded with the master key during creation of the device, is locked by setting a lock bit that prevents the master key from being altered or removed.

At step 725, prefix value 735 for the software module being loaded is retrieved from software image 732 stored on nonvolatile storage device 730, such as a hard disk or nonvolatile memory, located outside of the protected semiconductor package. Software image 732 includes prefix value 735, software code 745, and suffix value 750.

In step 755, a hashing algorithm, such as SHA-256, is seeded with a value based on the prefix value and the master key. In one embodiment, the hashing algorithm is seeded with the random number used to create the prefix value. In one embodiment, the seed value is generated by XORing the master key and the prefix value. The hashing algorithm is seeded by storing the seed value (e.g., the random number) as the initial value of the hashing result (memory location 765).

At step 770, the first block of software code is read from the requested software module 745. At step 775, the block of software code that was read is passed to a hashing algorithm, such as SHA-256. At step 780, the hashing algorithm receives the block of software code and the seed value stored in result 765. The result of the hashing algorithm is stored in result 765, overwriting the previous (seed) result value.

A determination is made as to whether the end of file has been reached on the software code (decision 782). If the end of file has not been reached, decision 782 branches to "no" branch 784 which loops back to read the next block of software code and process the next block using the hashing algorithm. This time, the hashing algorithm uses the read block of data along with the result from the prior hashing operation to hash the block of code. This looping continues until the end of file is reached on software code 745, whereupon decision 782 branches to "yes" branch 786.

Figure 8:
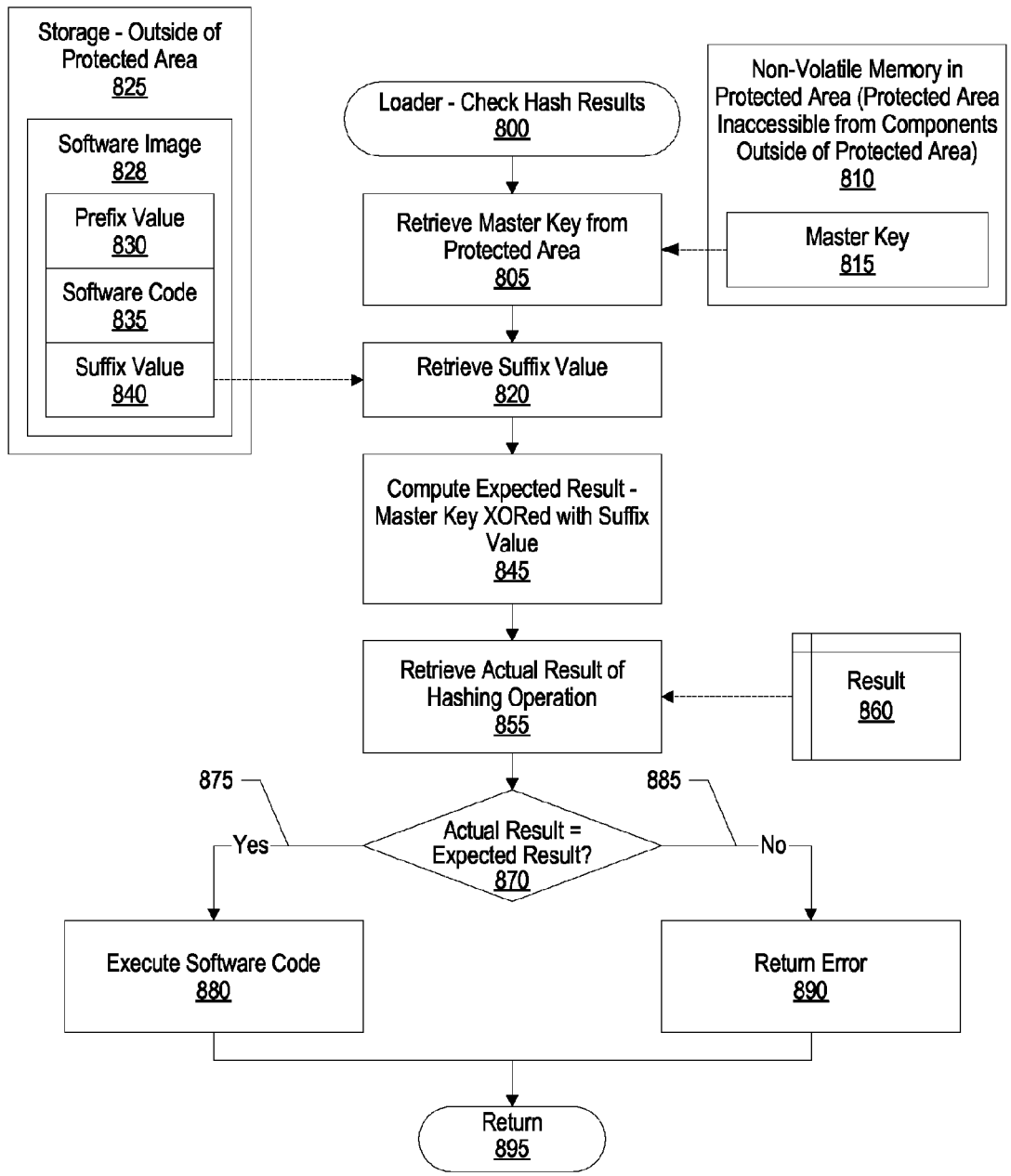
FIG. 8 is a flowchart showing steps taken to authenticate software based upon hash results.

A determination is made as to whether to software has been altered or whether the master key for which the software was created is different from the master key included in the device (predefined process 790, see FIG. 8 and corresponding text for processing details). Loader processing thereafter ends at 795.

FIG. 8 is a flowchart showing steps taken to authenticate software based upon hash results. This routine is called from predefined process 790, shown in FIG. 7.

The loader's check hash results processing commences at 800 whereupon, at step 805, master key 815 is retrieved from nonvolatile memory area 810 that is included in the protected semiconductor package. At step 820, suffix value 840 for the software that is being loaded is retrieved. The suffix value is part of software image 828. Software image 828 is stored in a storage area, such as system memory, outside of the protected semiconductor package. The software image also includes prefix value 830 and software code 835.

An expected result value is computed based upon the retrieved suffix value and the master key (step 845). In one embodiment, the expected result is generated by XORing the master key with the suffix value. At step 855, the actual result from the hashing operation (result 860) is retrieved from a memory location located inside of the protected semiconductor package. The actual result was previously generated using the processing shown on FIG. 7.

A determination is made as to whether the expected result is equal to the actual result (decision 870). If the expected result and the actual result are equal, decision 870 branches to "yes" branch 875 whereupon the software code is executed by the processor at step 880. On the other hand, if the results are not the same, decision 870 branches to "no" branch 885 whereupon an error is returned at step 890 and the software code is not executed. When the expected result is not the same as the actual result, either the software code was altered or the software was created for a different device with a different master key than the device from which the load request was issued. The loader's check hash results processing thereafter returns to the calling routine at 895.

Figure 9:
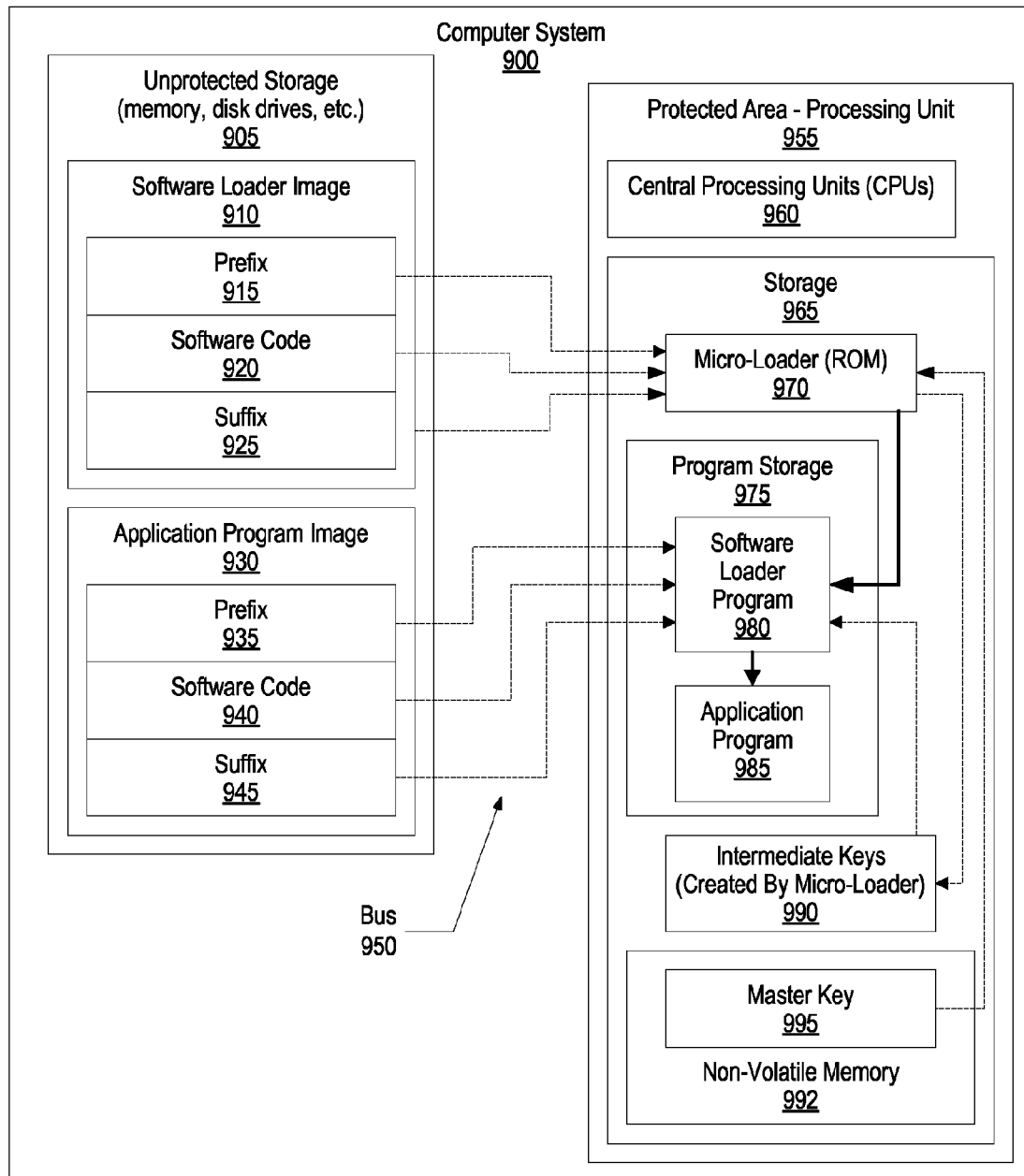
FIG. 9 is a system diagram showing a micro-loader used to load a software loader into a protected area of a processing unit.

FIG. 9 is a system diagram showing a micro-loader used to load a software loader into a protected area of a processing unit. Computer system 900 includes unprotected storage 905, such as system memory, disk devices, and the like, and protected semiconductor package 955 that includes packaged semiconductor components that interconnect within the package without use of a bus. Unprotected storage 905 and protected semiconductor package 955 communicate with one another using one or more busses, 950.

Unprotected storage 905 stores software loader image 910 and application program image 930. Each of these software images include a prefix value (915 and 935, respectively), software code (920 and 940, respectively), and a suffix value (925 and 945, respectively).

Protected semiconductor package 955 includes one or more processors 960, and storage 965. Storage 965 includes a read-only memory (ROM) of micro-loader code 970. The micro-loader is a scaled-down loader that is written to authenticate and load software loader 910. Software loader is a more robust loader that is designed to load application programs, such as application 930. In addition, micro-loader 970 is stored in read-only memory and, therefore, cannot be changed or altered without replacing the protected semiconductor package. Software loader 910, on the other hand, is stored in alterable memory, such as a hard disk, and can therefore be updated if errors in the loader are found or when enhancements or other modifications to the loader are created.

Storage 965 also includes program storage 975 into which both software loader 910 and application program 930 are loaded, in storage areas 980 and 985, respectively, in order to be executed by the processors. Storage further includes a memory location for storing intermediate keys 990 that are generated by the micro-loader while loading the software loader. Finally, storage 965 includes a locked nonvolatile memory 992, such as programmable fuses (e-fuses). Nonvolatile memory 992 is inaccessible from outside the protected semiconductor package. Nonvolatile memory 992 is used to store master key 995 which is a unique, random, nontrivial value of a sufficient length (e.g., 256 bits). After the device is created and the master key is stored in the nonvolatile memory, the nonvolatile memory is locked, thereby preventing further operations from altering or removing the master key.

Figure 10:
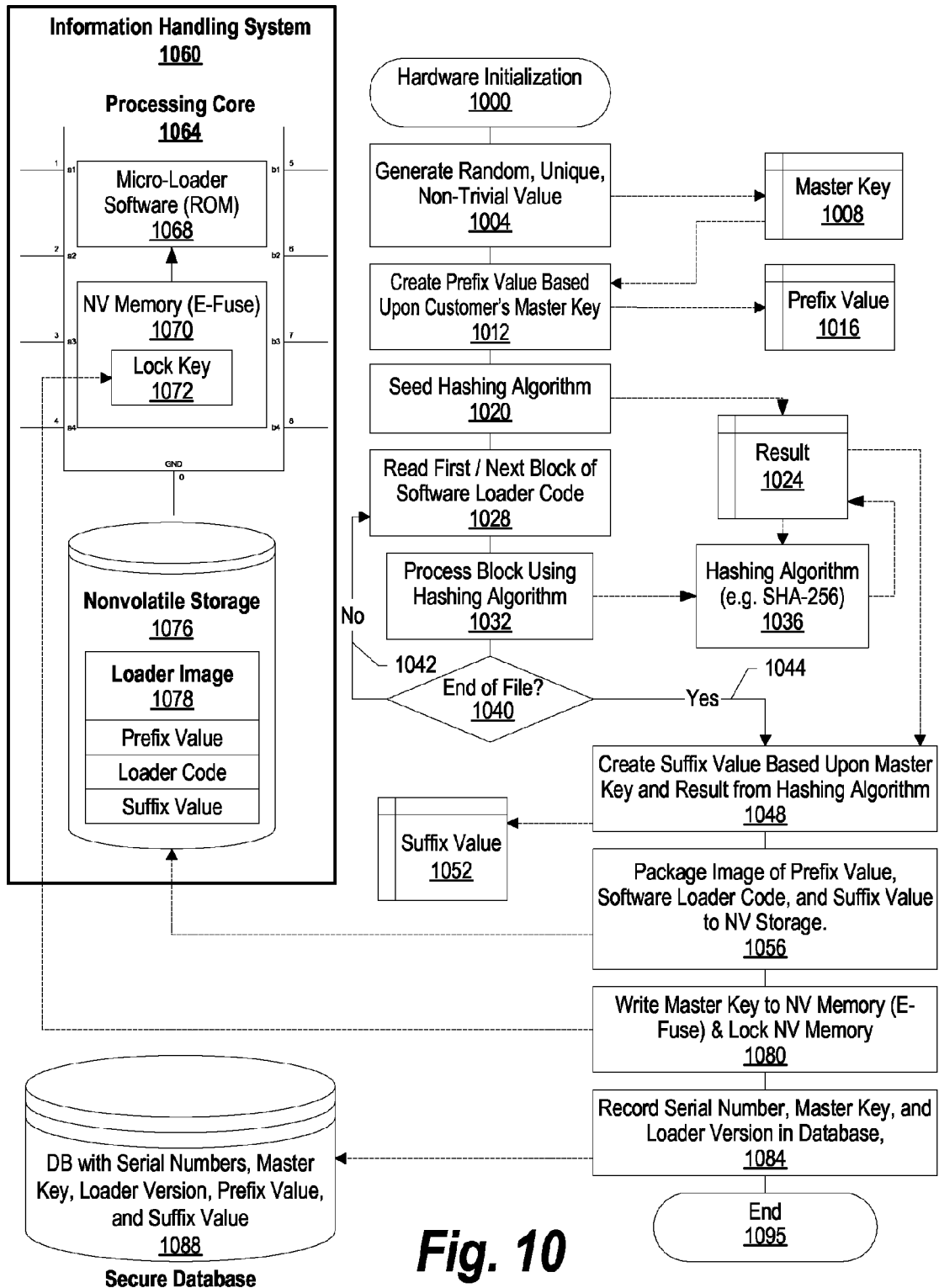
FIG. 10 is a flowchart showing hardware initialization with a micro-loader and master key written to a protected area of the processing core.

FIG. 10 is a flowchart showing hardware initialization with a micro-loader and master key written to a protected area of the processing core. Hardware initialization commences at 1000 whereupon, at step 1004, a random, unique, nontrivial master key value is generated of a sufficient length (i.e., 256 bits). The generated master key is stored in memory location 1008.

In step 1012, a prefix value is created based upon the generated master key and stored in memory location 1016. In one embodiment, the prefix value is created by XORing the generated master key with another random number. In step 1020, a hashing algorithm, such as SHA-256, is seeded using a value based upon the prefix value, such as the random number used to generate the prefix value. The seed value is used as an initial result 1024 of the hashing algorithm.

At step 1028, the first block of software loader code is read. The software loader code is the software loader that is loaded by the micro-loader. At step 1032, the block of software code that was read is passed to a hashing algorithm, such as SHA-256. At step 1036, the hashing algorithm receives the block of the software loader code and the seed value stored in result 1024. The result of the hashing algorithm is stored in result 1024, overwriting the previous (seed) result value.

A determination is made as to whether the end of file has been reached on the software loader code (decision 1040). If the end of file has not been reached, decision 1040 branches to "no" branch 1042 which loops back to read the next block of software loader code and process the next block using the hashing algorithm. This time, the hashing algorithm uses the read block of software loader code along with the result from the prior hashing operation to hash the block of code. This looping continues until the end of file is reached on the software loader, whereupon decision 1040 branches to "yes" branch 1044.

At step 1048, a suffix value is created based upon the master key and the final result resulting from the hashing algorithm and stored in memory location 1052. In one embodiment, the master key and final result are XORed to create the suffix value. At step 1056, the software loader image 1078 is created by packaging the loader code along with the prefix and suffix values and stored. Software loader image 1078 is stored on nonvolatile storage device 1076, such as a disk drive or nonvolatile memory, which is accessible from protected processing core 1064 and included in information handling system 1060. Protected processing core 1064 also includes micro-loader software, stored in ROM, that is programmed to use the master key to load and authenticate the loader code included in loader image 1078.

At step 1080, the generated master key is written to nonvolatile memory 1070 located within protected processing core 1064. Nonvolatile memory 1070 is also locked using lock key 1072. Locking the nonvolatile memory prevents any process from altering or removing the master key.

At step 1084, the unique identifier, such as a serial number, of the hardware being initialized is written to secure database 1088 along with the device's master key value and the version of the software loader (loader image 1078) that was stored on the device's nonvolatile storage device. Hardware initialization processing thereafter ends at 1095.

Figure 11:
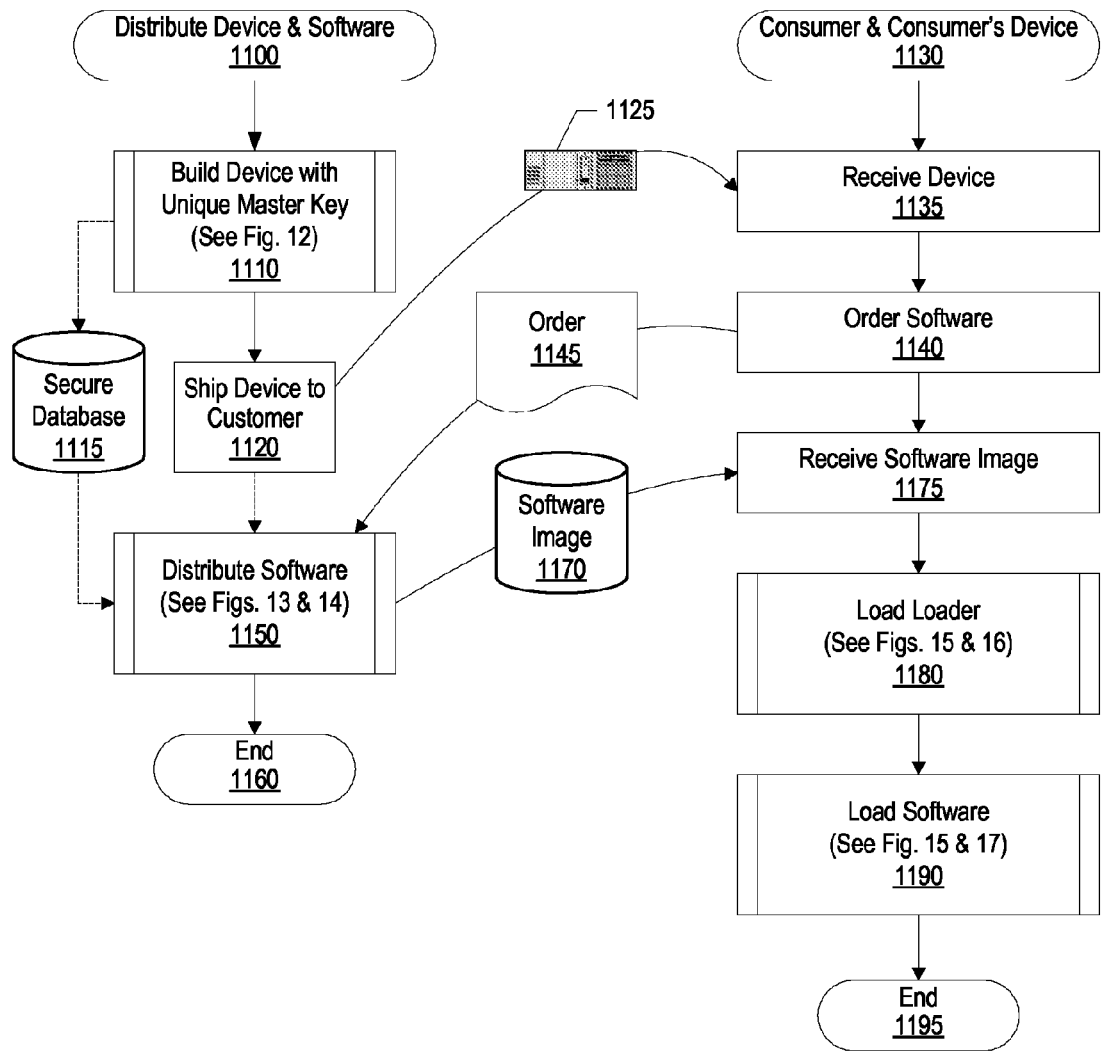
FIG. 11 are high level flowcharts showing steps taken to distribute devices and software utilizing a micro-loader stored in a protected processing area and a loader which is authenticated by the micro-loader.

FIG. 11 are high level flowcharts showing steps taken to distribute devices and software utilizing a micro-loader stored in a protected processing area and a loader which is authenticated by the micro-loader. Provider processing, used to distribute devices and software, commences at 1100. The device is built with a unique master key included in a protected processor core area (predefined process 1110, see FIG. 12 and corresponding text for processing details) and the master key value and device identifier written to secure database 1115. At step 1120, the device (device 1125) is shipped to a customer.

Consumer processing commences at 1130 whereupon, at step 1135, the consumer receives the device that has a master key embedded in its protected processor core area. At step 1140, the consumer orders software for the device and transmits order 1145 to a producer of the software.

Returning to producer processing, the producer receives customer's order 1145 that includes the unique identifier, such as the device serial number. The producer retrieves the master key value corresponding to the device from database 1115 in order to create software image 1170 (predefined process 1150, see FIGS. 13 and 14 and corresponding text for processing details). Thereafter, producer processing ends at 1160.

Returning to consumer processing, the consumer receives the software image corresponding to the ordered software at step 1175. When the consumer uses the device to load the software, the software loader is loaded by the micro-loader (predefined process 1180, see FIGS. 15 and 16 and corresponding text for processing details). Once the software loader has been loaded and authenticated, the software loader loads and authenticates the software program (predefined process 1190, see FIG. 15 and corresponding text for processing details). Consumer processing thereafter ends at 1195.

Figure 12:
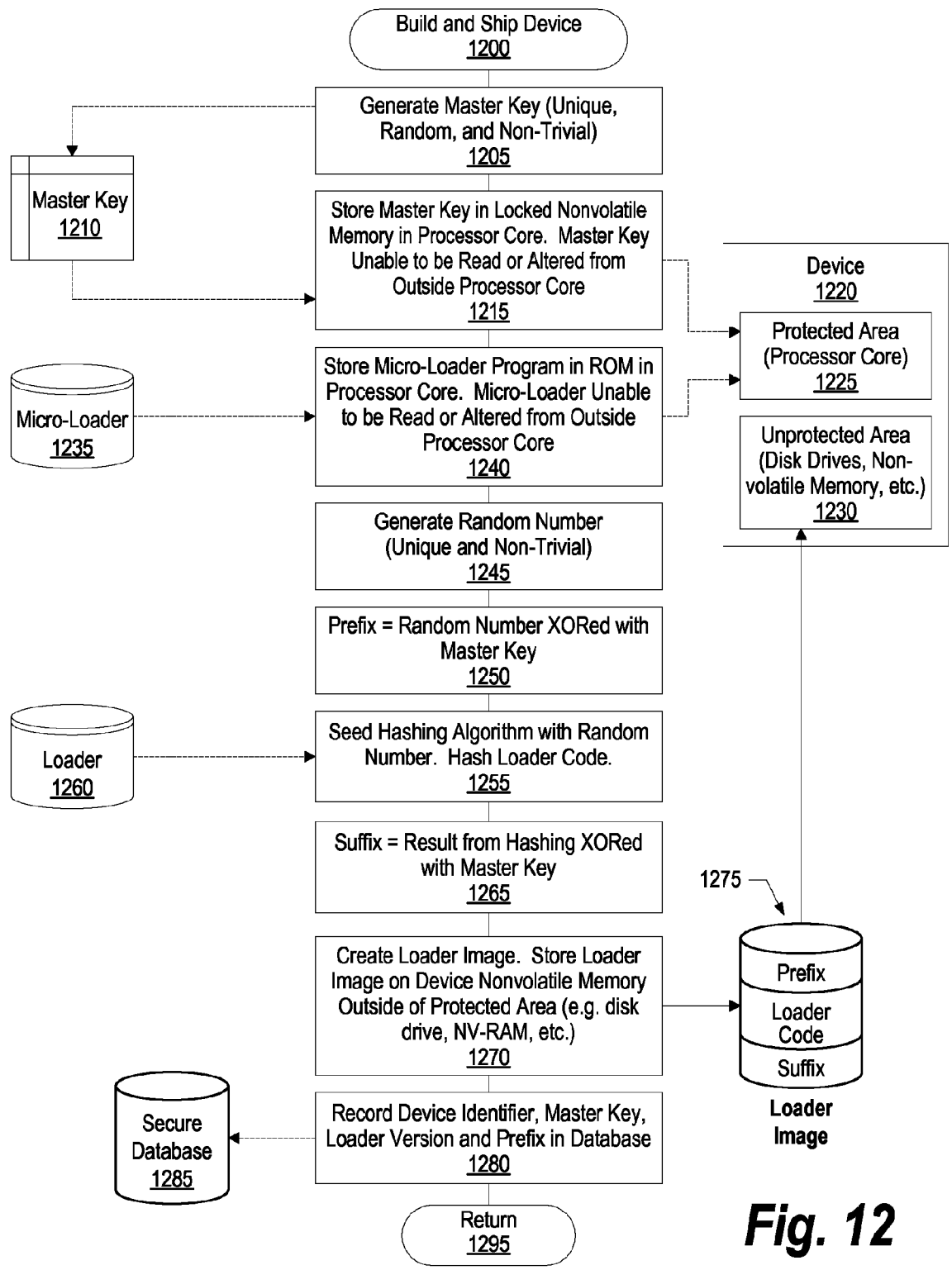
FIG. 12 is a flowchart showing steps taken to distribute the device with a micro-loader, loader, and authentication keys.

FIG. 12 is a flowchart showing steps taken to distribute the device with a micro-loader, loader, and authentication keys. The processing shown in FIG. 12 is called from predefined process 1110 shown in FIG. 11.

Device creation processing commences at 1200 whereupon, at step 1205, a unique, random, and nontrivial master key is generated and stored in memory location 1210. At step 1215, the master key is stored in a nonvolatile memory area located within protected area 1225 of the processor core within device 1220. After the master key is stored, the nonvolatile memory area in the protected area is locked so that the master key cannot be altered or removed.

At step 1240, micro-loader program 1235 is stored in ROM in the processor core. The micro-loader is unable to be read or altered from outside the protected area of the device. At step 1245, another random number is generated. A prefix value is calculated based upon the generated random number and the master key (step 1250). In one embodiment, the prefix is calculated by XORing the master key with the random number.

At step 1255, a hashing algorithm, such as SHA-256, is seeded with the random number generated in step 1245 and software loader 1260 is hashed using the hashing algorithm. A suffix value is then calculated, at step 1265, by combining the result of the hashing algorithm with the master key. In one embodiment, the master key and the result from the hashing algorithm are XORed to create the suffix value. At step 1270, loader image 1275 is created using the prefix value, the suffix value, and the loader code. The loader image is stored in an unprotected area, such as a disk drive or other nonvolatile memory location, within device 1220 in an area accessible by the protected processor core.

At step 1280, the device identifier (i.e., serial number) is stored along with the device's master key value, loader version, and prefix value in secure database 1285. Device creation processing thereafter returns at 1295.

Figure 13:
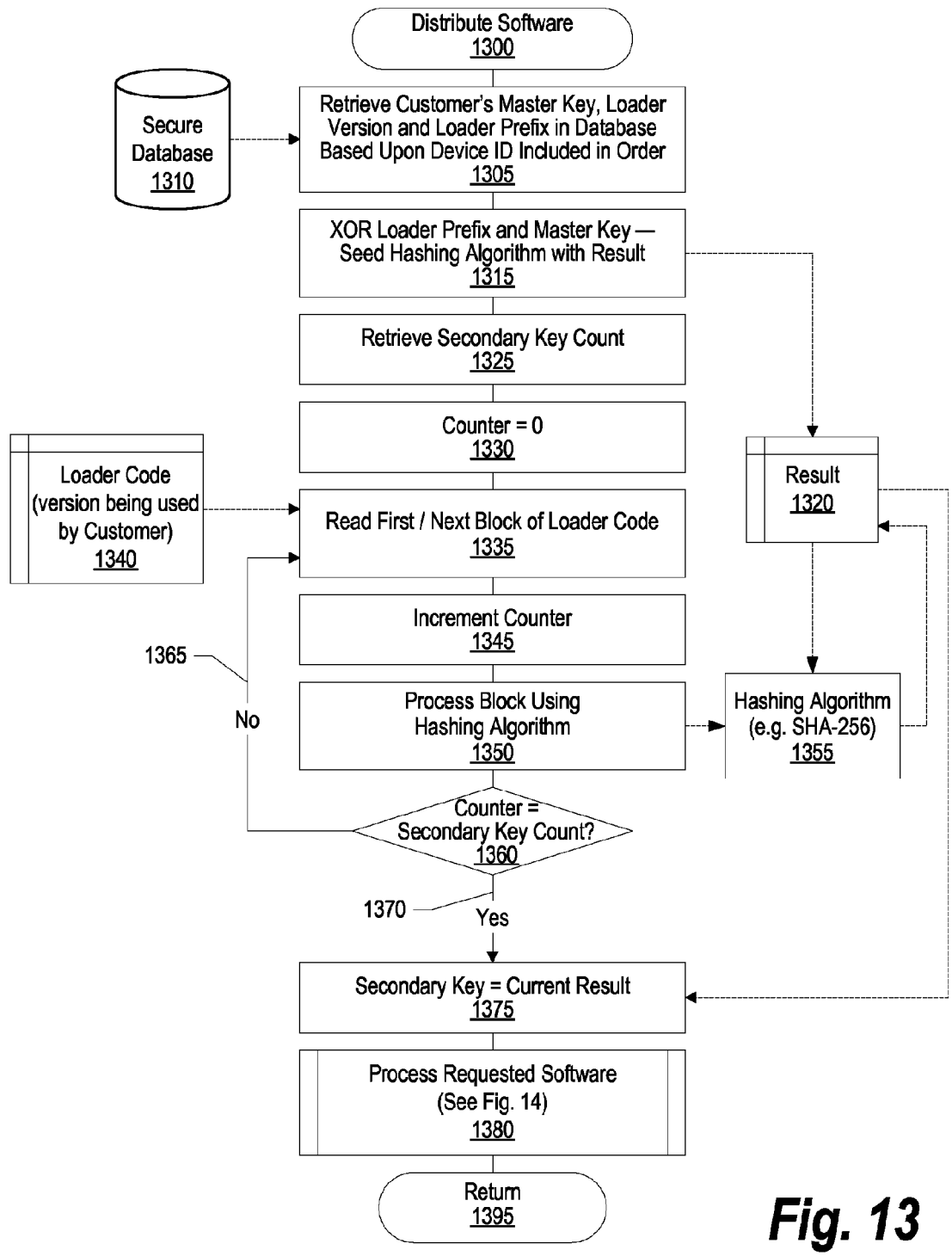
FIG. 13 is a flowchart showing steps taken to distribute software that is adapted to be loaded by a device using a micro-loader and a loader.

FIG. 13 is a flowchart showing steps taken to distribute software that is adapted to be loaded by a device using a micro-loader and a loader. The processing shown in FIG. 13 is called from predefined process 1150 shown in FIG. 11.

Software distribution processing commences at 1300 whereupon the master key, loader version, and loader prefix value corresponding to the customer's device are retrieved (step 1305) from secure database 1310. At step 1315, a hashing algorithm, such as SHA-256, is seeded with a value based upon the loader prefix and the master key. In one embodiment, the seed value is created by XORing the master key with the loader prefix value. The hashing algorithm is seeded by storing the seed value (e.g., the random number resulting from the XOR operation) as the initial value of the hashing result (memory location 1320).

A secondary key count is retrieved at step 1325. The secondary key count indicates the number of iterations of the hashing algorithm that are performed after which the current result is used as a secondary key value. For example, if the secondary key count is "10", then after the hashing algorithm iterates 10 times, whatever result is in result memory area 1320 is used as a secondary key by the software loader. At step 1330, a counter that is used to track the number of iterations is initialized to zero.

At step 1335, the first block of the loader code that is installed on the customer's device is read from memory area 1340. At step 1345, the counter is incremented to indicate that the hashing algorithm has been performed once and, at step 1350, the block of code is processed using the hashing algorithm. At step 1355, the hashing algorithm receives the block of software code and the seed value stored in result 1320. The result of the hashing algorithm is stored in result 1320, overwriting the previous (seed) result value.

A determination is made as to whether the counter is equal to the secondary key count constant (decision 1360). If the counter has not yet reached the secondary key count, decision 1360 branches to "no" branch 1365 whereupon processing loops back to process the next block of loader code and increment the counter. This looping continues until the counter is equal to the secondary key count, at which point decision 1360 branches to "yes" branch 1370.

At step 1375, the secondary key value is set to the current result resulting from a number of iterations of the hashing algorithm. The software application, such as an application program or game software, is then processed using the secondary key value (predefined process 1380, see FIG. 14 and corresponding text for processing details). Processing thereafter returns to the calling procedure at 1395.

Figure 14:
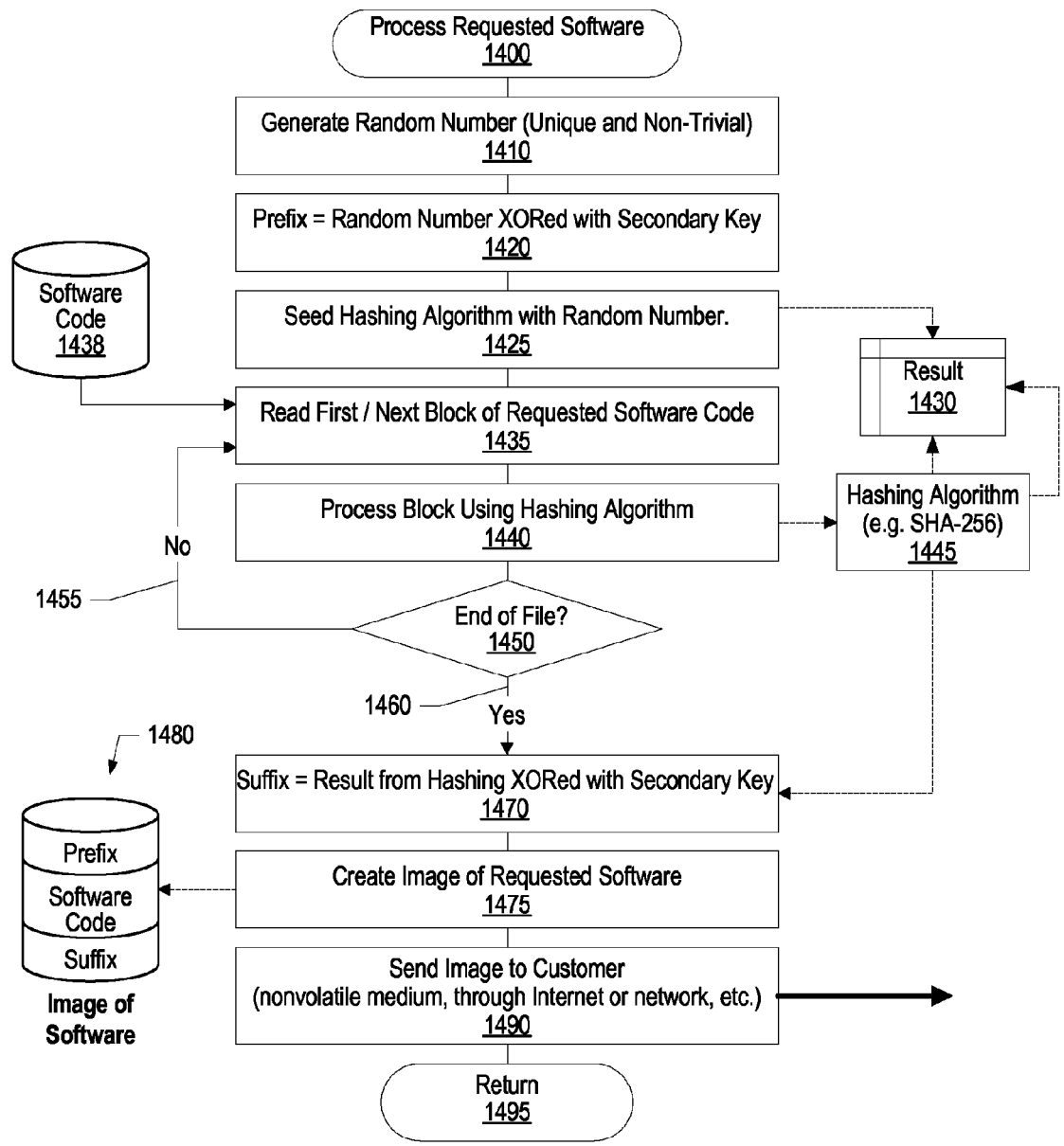
FIG. 14 is a flowchart showing steps taken to prepare a software image with authentication information for delivery to a customer.

FIG. 14 is a flowchart showing steps taken to prepare a software image with authentication information for delivery to a customer. The processing shown in FIG. 14 is called from predefined process 1380 shown in FIG. 13.

Processing to create an image of the requested software commences at 1400 whereupon a random number is generated at step 1410. A prefix value is determined based upon the random number and the secondary key value (step 1420, see FIG. 13 for a details on the creation of the secondary key value). In one embodiment, an exclusive or (XOR) operation is performed between the random value and the secondary key value to create the prefix value. In step 1425, a hashing algorithm, such as SHA-256, is seeded using a value based upon the prefix value, such as the random number used to generate the prefix value. The seed value is used as an initial result 1430 of the hashing algorithm.

At step 1435, the first block of software code 1438 requested by the user is read. At step 1440, the block of software code that was read is passed to a hashing algorithm, such as SHA-256. At step 1445, the hashing algorithm receives the block of the software code and the seed value stored in result 1430. The result of the hashing algorithm is stored in result 1430, overwriting the previous (seed) result value.

A determination is made as to whether the end of file has been reached on the software code (decision 1450). If the end of file has not been reached, decision 1450 branches to "no" branch 1455 which loops back to read the next block of software code and process the next block using the hashing algorithm. This time, the hashing algorithm uses the read block of software code along with the result from the prior hashing operation to hash the block of code. This looping continues until the end of file is reached on the software code, whereupon decision 1450 branches to "yes" branch 1460.

At step 1470, a suffix value is created based upon the secondary key and the final result resulting from the hashing algorithm. In one embodiment, the secondary key and final result are XORed to create the suffix value. At step 1475, software image 1480 is created by packaging the software code along with the prefix and suffix values. At step 1490, software image 1480 is sent to the customer, either on a nonvolatile medium, through the Internet, or in any other fashion. Processing thereafter returns to the calling routine at 1495.

Figure 15:
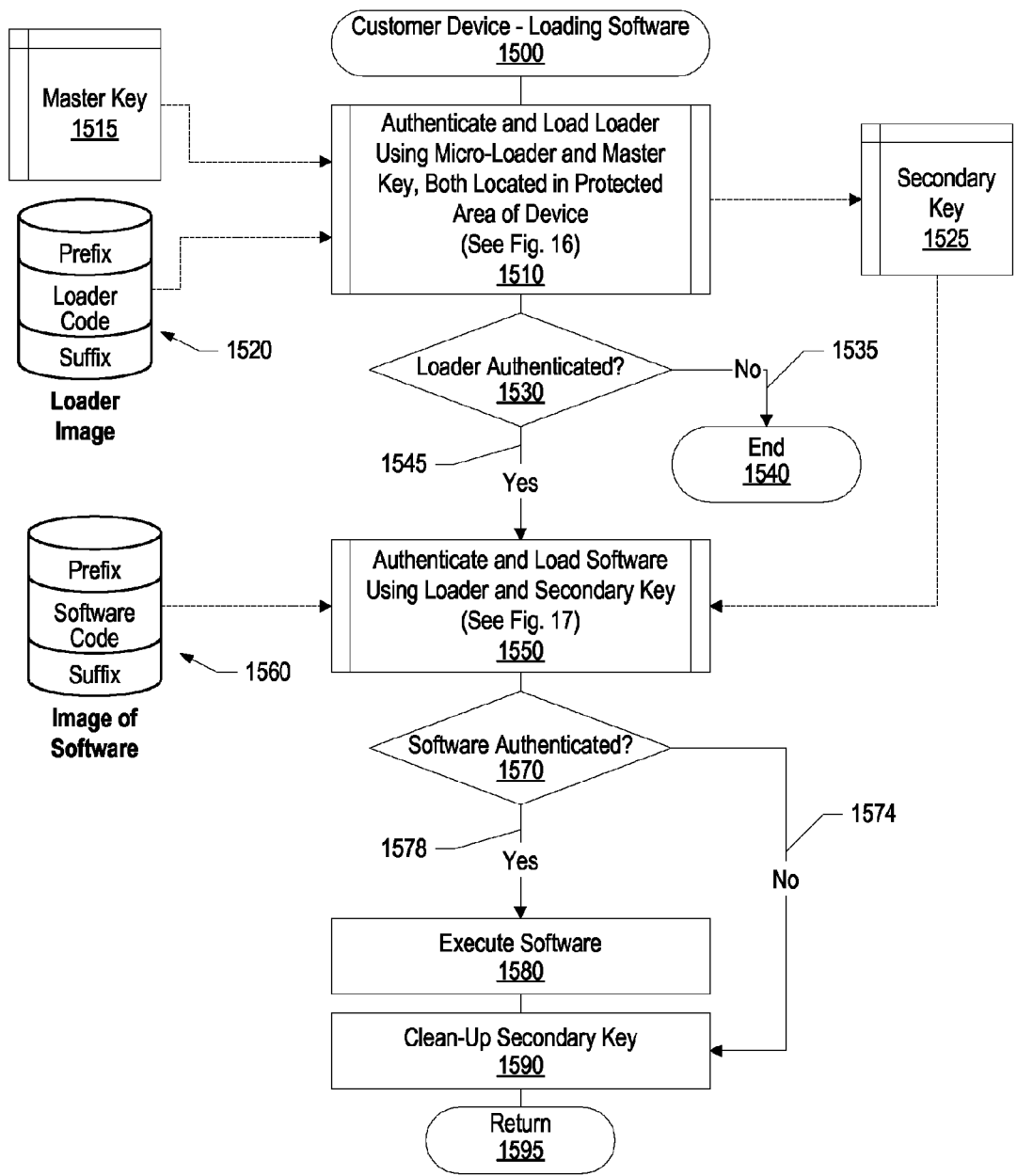
FIG. 15 is a flowchart showing steps taken by a customer's device to load software using authentication by a micro-loader and loader.

FIG. 15 is a flowchart showing steps taken by a customer's device to load software using authentication by a microloader and loader. The processing shown in FIG. 15 is called from predefined processes 1180 and 1190 shown in FIG. 11.

Figure 16:
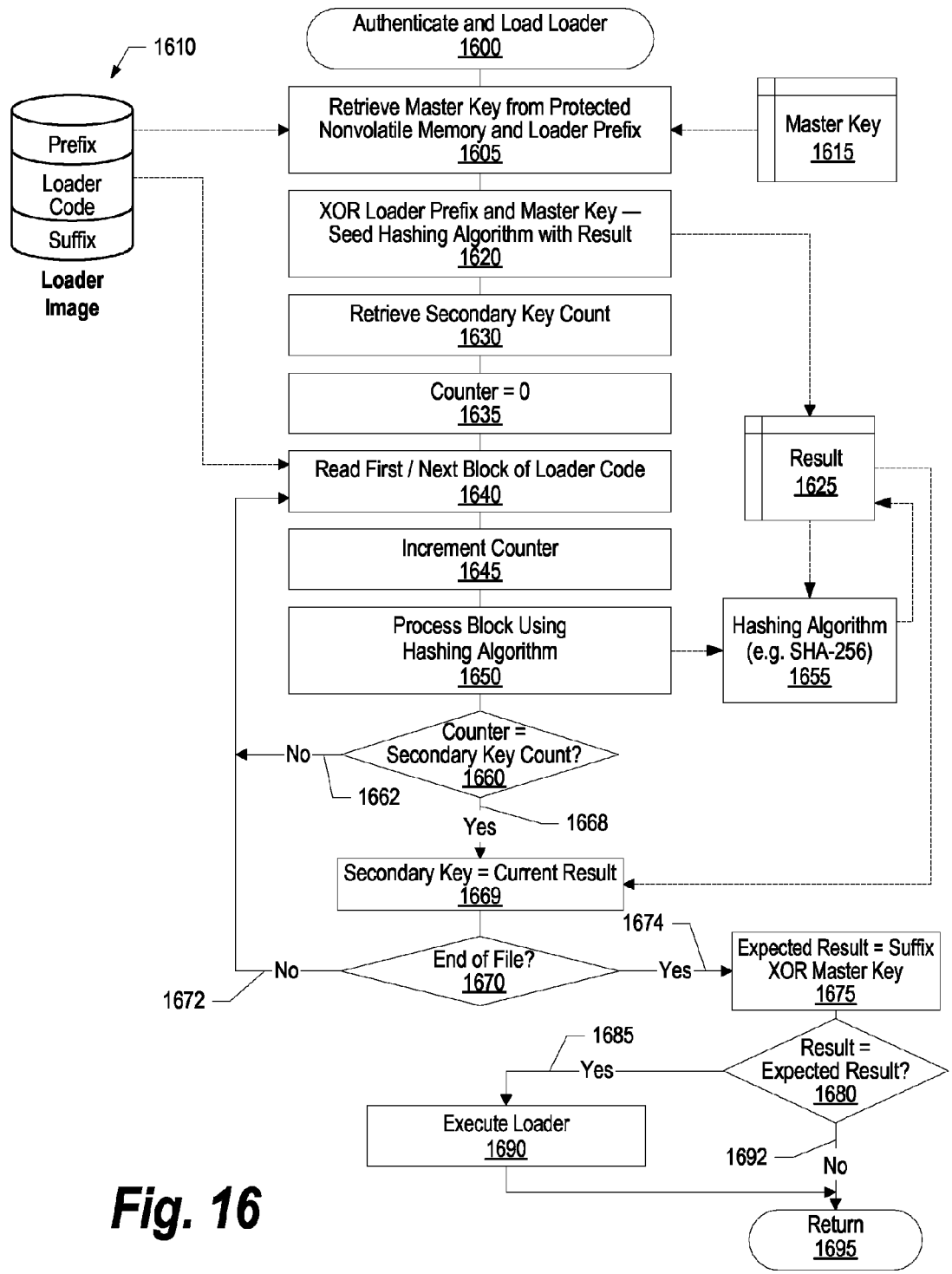
FIG. 16 is a flowchart showing steps taken to authenticate and load the loader software generating a secondary key.

The process of loading software on the customer's device commences at 1500 whereupon master key 1515, located in a locked, nonvolatile storage area within the device's operating core is used to authenticate and load software loader image 1520 and generate secondary key 1525 ((predefined process 1510, see FIG. 16 and corresponding text for processing details).

A determination is made as to whether the loader was authenticated by the micro-loader (decision 1530). If the loader was not authenticated, decision 1530 branches to "no" branch 1535 and processing ends at 1540. On the other hand, if the loader was authenticated by the micro-loader, decision 1530 branches to "yes" branch 1545 whereupon the software requested to be executed by the customer (image 1560) is authenticated and loaded using the loader software and the secondary key value (predefined process 1550, see FIG. 17 and corresponding text for processing details).

A determination is made as to whether the software was authenticated (decision 1570). If the software was not authenticated, decision 1570 branches to "no" branch 1574 whereupon the secondary key values are removed (cleaned up) from processor core storage memory (step 1590). On the other hand, if the software was authenticated, decision 1570 branches to "yes" branch 1578 whereupon the software code is executed by the processor at step 1580 and the secondary keys are removed (cleaned up) from processor core storage memory at step 1590. Processing thereafter returns to the calling routine at 1595.

FIG. 16 is a flowchart showing steps taken to authenticate and load the loader software generating a secondary key. The processing shown in FIG. 16 is called from predefined processes 1510 shown in FIG. 15.

Micro-loader processing used to authenticate and load the software loader commences at 1600 whereupon, in step 1605, master key 1615 for the device is retrieved by the microloader from locked nonvolatile memory and the prefix value corresponding to software loader image 1610 is retrieved from a non-protected area (e.g., system memory).

At step 1620, a hashing algorithm, such as SHA-256, is seeded with a value based upon the loader prefix and the master key. In one embodiment, the seed value is created by XORing the master key with the loader prefix value. The hashing algorithm is seeded by storing the seed value (e.g., the random number resulting from the XOR operation) as the initial value of the hashing result (memory location 1625).

A secondary key count is retrieved at step 1630. The secondary key count indicates the number of iterations of the hashing algorithm that are performed after which the current result is used as a secondary key value. For example, if the secondary key count is "10", then after the hashing algorithm iterates 10 times, whatever result is in result memory area 1625 is used as a secondary key by the software loader. In one embodiment, the secondary key count is retrieved from the locked nonvolatile memory area that is used to store the master key. At step 1635, a counter that is used to track the number of iterations is initialized to zero.

At step 1640, the first block of the loader code that is installed on the customer's device is read from loader image 1610. At step 1645, the counter is incremented to indicate that the hashing algorithm has been performed once and, at step 1650, the block of code is processed using the hashing algorithm. At step 1655, the hashing algorithm receives the block of software code and the seed value stored in result 1625. The result of the hashing algorithm is stored in result 1625, overwriting the previous (seed) result value.

A determination is made as to whether the counter is equal to the secondary key count constant (decision 1660). If the counter has not yet reached the secondary key count, decision 1660 branches to "no" branch 1662 whereupon processing loops back to process the next block of loader code and increment the counter. This looping continues until the counter is equal to the secondary key count, at which point decision 1660 branches to "yes" branch 1668 whereupon, at step 1669, the secondary key value is set to the current result resulting from a number of iterations of the hashing algorithm.

A determination is made as to whether the end of the software loader file has been reached (decision 1670). If the end of the file has not been reached, decision 1670 branches to "no" branch 1672 whereupon processing loops back to process the next block of code from the software loader using the hashing algorithm. This looping continues until the end of file has been reached, at which point decision 1670 branches to "yes" branch 1674.

At step 1675, the expected result is determined based upon the suffix value and the master key. In one embodiment, the expected result is calculated by XORing the master key with the suffix value. A determination is made as to whether the result resulting from the hashing algorithm is equal to the expected result (decision 1680). If the result from the hashing algorithm is equal to the expected result, decision 1680 branches to "yes" branch 1685 whereupon the software loader is executed at step 1690. On the other hand, if the result resulting from the hashing algorithm is not equal to the expected result (indicating that either the loading program was altered or that the loading program found on the device is a different loading program than the one originally shipped with the device), then decision 1680 branches to "no" branch 1692 bypassing the execution of the software loading program. Processing thereafter returns to the calling routine at 1695.

Figure 17:
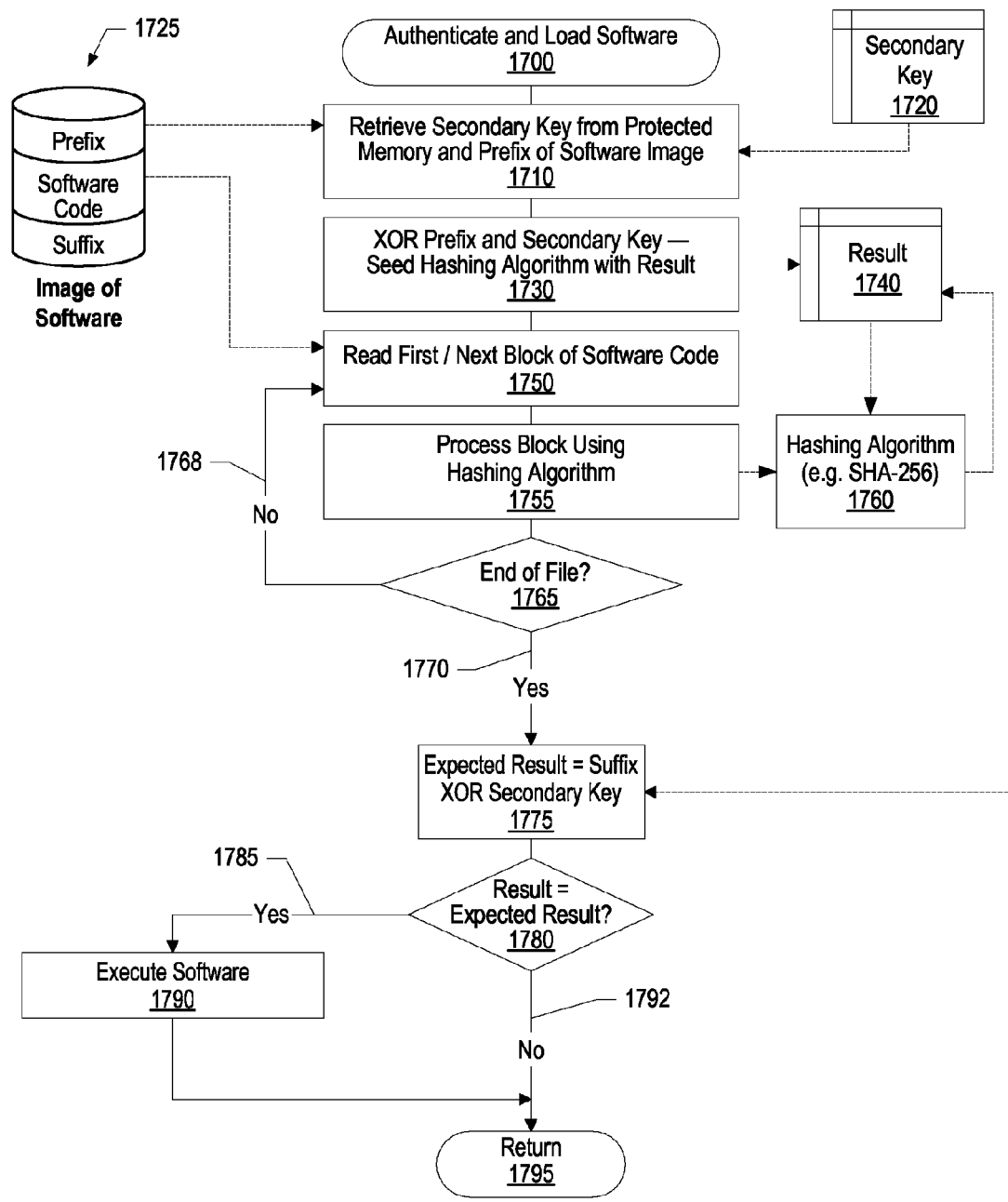
FIG. 17 is a flowchart showing steps taken to authenticate and load the software using a secondary key.

FIG. 17 is a flowchart showing steps taken to authenticate and load the software using a secondary key. The processing shown in FIG. 17 is called from predefined processes 1550 shown in FIG. 15 after the secondary key has been determined using the processing shown in FIG. 16.

In FIG. 17, processing used to authenticate and load software using a secondary key value commences at 1700. At step 1710, the secondary key value (determined using the processing shown on FIG. 16 and stored in a memory area within the protected processing core) is retrieved along with the prefix value for software image 1725.

In step 1725, a hashing algorithm, such as SHA-256, is seeded using a value based upon the prefix value, such as a random number that was used to generate the prefix value. The seed value is used as initial result 1740 of the hashing algorithm. In one embodiment, an exclusive or (XOR) operation is performed between secondary key 1720 and the prefix value resulting in the random number that was originally used in creating the prefix value. This random number is used to seed the hashing algorithm.

At step 1750, the first block of the software code included in software image 1725 is read. At step 1755, the block of software code that was read is passed to a hashing algorithm, such as SHA-256. At step 1760, the hashing algorithm receives the block of the software code and the seed value stored in result 1740. The result of the hashing algorithm is stored in result 1740, overwriting the previous (seed) result value.

A determination is made as to whether the end of file has been reached on the software code (decision 1765). If the end of file has not been reached, decision 1765 branches to "no" branch 1768 which loops back to read the next block of software code and process the next block using the hashing algorithm. This time, the hashing algorithm uses the read block of software code along with the result from the prior hashing operation to hash the block of code. This looping continues until the end of file is reached on the software code, whereupon decision 1765 branches to "yes" branch 1770.

At step 1775, an expected result value is created using the suffix value from software image 1725 and secondary key value 1720. In one embodiment, these two values are XORed to generate the expected result. A determination is made as to whether the result resulting from the hashing algorithm is equal to the expected result (decision 1780). If the result from the hashing algorithm is equal to the expected result, decision 1780 branches to "yes" branch 1785 whereupon the software program is executed at step 1790. On the other hand, if the result resulting from the hashing algorithm is not equal to the expected result (indicating that either the software program was altered or that the software program found on the device was created for a different device using a different set of keys), then decision 1780 branches to "no" branch 1792 bypassing the execution of the software program. Processing thereafter returns to the calling routine at 1795.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The use of the words "prefix" and "suffix" to describe authentication values used herein does not imply that such values need to be located in any particular area relative to the corresponding software code. Rather, such terms are used to describe when the values are used in conjunction with the authentication process. The prefix value is used to determine a seed value for the authentication process, while the suffix value is used to generate an expected result that is in turn compared with a result from the hashing algorithm. The actual prefix and suffix values can be stored either along with their respective software modules, or can be stored separately in a location distinct and apart from the software module.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of providing a device adapted to authenticate software code, said method comprising:

generating a master key value;

writing the master key value to a nonvolatile memory, wherein the nonvolatile memory and one or more processors are included in a common semiconductor package within the device;

locking the nonvolatile memory;

recording the master key value and a device identifier in a database;

receiving an order for a software program from a customer, the order including the device identifier and a software program identifier corresponding to the software program;

retrieving the master key value from the database based upon the device identifier included in the received order;

creating a software image based upon the retrieved master key value and the software program corresponding to the software program identifier; and delivering the software image to the customer.

2. The method of claim 1 wherein the device identifier is a serial number that uniquely identifies the device.

3. The method of claim 1 further comprising:

shipping the device to a customer.

4. The method of claim 1 wherein the creating the software image further comprises:

generating a random number;

creating a prefix value based upon the master key value and the random number;

seeding a hashing algorithm with the random number;

hashing the software program using the seeded hashing algorithm, the hashing algorithm resulting in a hash result;

creating a suffix value based upon the master key value and the hash result; and including the prefix value, software program, and suffix value in the software image.

5. The method of claim 4 wherein the creation of the prefix value includes performing an XOR operation between the master key value and the random number.

6. The method of claim 4 wherein the creation of the suffix value includes performing an XOR operation between the master key value and the hash result.

7. A computer program product stored on a computer storage media, the computer storage media containing instructions for execution by a computer, which, when executed by the computer, cause the computer to implement a method to provide a device adapted to authenticate software code, said method comprising:

for generating a master key value;

writing the master key value to a nonvolatile memory, wherein the nonvolatile memory and one or more processors are included in a common semiconductor package within the device;

locking the nonvolatile memory;

recording the master key value and a device identifier in a database;

receiving an order for a software program from a customer, the order including the device identifier and a software program identifier corresponding to the software program;

retrieving the master key value from the database based upon the device identifier included in the received order;

creating a software image based upon the retrieved master key value and the software program corresponding to the software program identifier; and delivering the software image to the customer.

8. The computer program product of claim 7 wherein the device identifier is a serial number that uniquely identifies the device.

9. The computer program product of claim 7 wherein the creating the software image further comprises:

generating a random number;

creating a prefix value based upon the master key value and the random number;

seeding a hashing algorithm with the random number;

hashing the software program using the seeded hashing algorithm, the hashing algorithm resulting in a hash result;

creating a suffix value based upon the master key value and the hash result; and including the prefix value, software program, and suffix value in the software image.

10. The computer program product of claim 9 wherein the creating the prefix value includes performing an XOR operation between the master key value and the random number.

11. The computer program product of claim 9 wherein the creating the suffix value includes performing an XOR operation between the master key value and the hash result.

* * * * *